US008340260B1

(12) United States Patent
Rae et al.

(10) Patent No.: US 8,340,260 B1
(45) Date of Patent: *Dec. 25, 2012

(54) INMATE MANAGEMENT AND CALL PROCESSING SYSTEMS AND METHODS

(75) Inventors: Robert L. Rae, Plano, TX (US); Stuart Rosenfield, Plano, TX (US)

(73) Assignee: Securus Technologies, Inc., Dallas, TX (US)

(*) Notice: Subject to any disclaimer, the term of this patent is extended or adjusted under 35 U.S.C. 154(b) by 700 days.

This patent is subject to a terminal disclaimer.

(21) Appl. No.: 12/410,378

(22) Filed: Mar. 24, 2009

Related U.S. Application Data

(63) Continuation of application No. 11/777,168, filed on Jul. 12, 2007, now Pat. No. 7,529,357, which is a continuation-in-part of application No. 10/642,532, filed on Aug. 15, 2003, now Pat. No. 7,899,167.

(51) Int. Cl.
  H04M 3/00 (2006.01)
  H04M 3/20 (2006.01)
  H04M 1/64 (2006.01)
  H04L 12/66 (2006.01)
  H04L 12/16 (2006.01)
  G06F 15/16 (2006.01)

(52) U.S. Cl. ........ 379/189; 370/261; 370/352; 370/353; 370/354; 370/356; 379/88.25; 379/306; 709/217; 709/212; 709/227; 709/228; 709/229

(58) Field of Classification Search .......... 370/352–356, 370/261; 709/217, 212, 227–229; 379/188–189, 379/67.1–88.25, 15.01–15.04, 32.01, 93.02–93.03, 379/100.03–100.05, 106.02, 114.29, 133–134, 379/142.05, 165, 201.01–201.02, 201.12, 379/221.08

See application file for complete search history.

(56) References Cited

U.S. PATENT DOCUMENTS 3,096,404 A  7/1963 Semon
(Continued)

FOREIGN PATENT DOCUMENTS

EP  0185365 A1  6/1986
(Continued)

OTHER PUBLICATIONS

Anderson, Susan, "Three-Way Call Detect . . . Close Enough to Perfect?" Correctional Communications Quarterly, pp. 16-20, Oct. 1993.

(Continued)

Primary Examiner — Melanie Jagannathan
Assistant Examiner — Wutchung Chu
(74) Attorney, Agent, or Firm — Fenwick & West LLP

(57) ABSTRACT

Disclosed are systems and methods that provide centralized or nodal inmate management and telephone call processing capabilities to controlled environment facilities. An inmate management and call processing system serves a plurality of facilities and includes an inmate information database. The database is shared across the facilities and contains inmate records that may be accessed and modified by each facility as the inmate is transferred among those facilities. Each inmate record may include, among other information, contact information of third parties whom may be notified of the inmate's arrest and/or subsequent transfers of the inmate to different facilities. The inmate management and telephone call processing system may use third party contact information to establish accounts used to charge calls or transactions made by an inmate while residing at the facility. Some systems may also provide call processing, video conferencing, e-mail, voicemail, and/or videomail applications, and the like to the facilities.

20 Claims, 3 Drawing Sheets

U.S. PATENT DOCUMENTS

| | | |
|---|---|---|
| 3,113,185 A | 12/1963 | Semon |
| 3,350,515 A | 10/1967 | Semon |
| 3,397,288 A | 8/1968 | Semon |
| 3,398,288 A | 8/1968 | Sanders et al. |
| 3,626,107 A | 12/1971 | Armstrong et al. |
| 3,660,610 A | 5/1972 | Hestad et al. |
| 3,676,605 A | 7/1972 | Johnson |
| 3,798,382 A | 3/1974 | Hoven |
| 3,813,495 A | 5/1974 | Conerly |
| 3,829,617 A | 8/1974 | Caithamer et al. |
| 3,851,121 A | 11/1974 | Marvin |
| 3,864,519 A | 2/1975 | Owen |
| 3,952,160 A | 4/1976 | Pasternack et al. |
| 3,985,956 A | 10/1976 | Monti et al. |
| 3,997,731 A | 12/1976 | Wilmot et al. |
| 4,001,513 A | 1/1977 | Naylor |
| 4,002,848 A | 1/1977 | Stein |
| 4,027,109 A | 5/1977 | Smith et al. |
| 4,054,756 A | 10/1977 | Comella et al. |
| 4,055,730 A | 10/1977 | Stapleford et al. |
| 4,122,308 A | 10/1978 | Weinberger et al. |
| 4,156,799 A | 5/1979 | Cave |
| 4,188,508 A | 2/1980 | Rogers et al. |
| 4,196,317 A | 4/1980 | Bartelink |
| 4,310,726 A | 1/1982 | Asmuth |
| 4,319,091 A | 3/1982 | Meri |
| 4,326,123 A | 4/1982 | Hosterman |
| 4,333,056 A | 6/1982 | Cave |
| 4,371,752 A | 2/1983 | Matthews et al. |
| 4,387,274 A | 6/1983 | Stein et al. |
| 4,405,833 A | 9/1983 | Cave et al. |
| 4,439,636 A | 3/1984 | Newkirk et al. |
| 4,445,211 A | 4/1984 | Webber |
| 4,477,698 A | 10/1984 | Szlam et al. |
| 4,518,825 A | 5/1985 | Brinkerhoff et al. |
| 4,538,030 A | 8/1985 | Fossett et al. |
| 4,540,855 A | 9/1985 | Szlam et al. |
| 4,552,996 A | 11/1985 | de Bergh |
| 4,559,416 A | 12/1985 | Theis et al. |
| 4,585,904 A | 4/1986 | Mincone et al. |
| 4,593,157 A | 6/1986 | Usdan |
| 4,595,983 A | 6/1986 | Gehalo et al. |
| 4,602,129 A | 7/1986 | Matthews et al. |
| 4,626,630 A | 12/1986 | Waldman |
| 4,629,829 A | 12/1986 | Puhl et al. |
| 4,644,109 A | 2/1987 | Takeda et al. |
| 4,686,699 A | 8/1987 | Wilkie |
| 4,696,028 A | 9/1987 | Morganstein et al. |
| 4,696,031 A | 9/1987 | Freudberg et al. |
| 4,698,840 A | 10/1987 | Dively et al. |
| 4,712,230 A | 12/1987 | Rice et al. |
| 4,723,273 A | 2/1988 | Diesel et al. |
| 4,726,057 A | 2/1988 | Doerry et al. |
| 4,727,577 A | 2/1988 | Frey et al. |
| 4,731,818 A | 3/1988 | Clark, Jr. et al. |
| 4,736,405 A | 4/1988 | Akiyama |
| 4,737,982 A | 4/1988 | Boratgis et al. |
| 4,746,786 A | 5/1988 | Heberle et al. |
| 4,763,350 A | 8/1988 | Immendorfer et al. |
| 4,766,604 A | 8/1988 | Axberg |
| 4,768,223 A | 8/1988 | Kinoshita et al. |
| 4,768,227 A | 8/1988 | Dively et al. |
| 4,769,834 A | 9/1988 | Billinger et al. |
| 4,777,647 A | 10/1988 | Smith et al. |
| 4,782,516 A | 11/1988 | Maybach et al. |
| 4,791,640 A | 12/1988 | Sand |
| 4,794,642 A | 12/1988 | Arbabzadah et al. |
| 4,797,910 A | 1/1989 | Daudelin |
| 4,799,255 A | 1/1989 | Billinger et al. |
| 4,802,207 A | 1/1989 | Uchida |
| 4,803,718 A | 2/1989 | Neil et al. |
| 4,815,120 A | 3/1989 | Kosich |
| 4,825,460 A | 4/1989 | Carter et al. |
| 4,839,917 A | 6/1989 | Oliver |
| 4,850,011 A | 7/1989 | Delmege et al. |
| 4,868,873 A | 9/1989 | Kamil |
| 4,885,765 A | 12/1989 | Shirakawa |
| 4,890,317 A | 12/1989 | Hird et al. |
| 4,896,348 A | 1/1990 | Grantland et al. |
| 4,899,358 A | 2/1990 | Blakley |
| 4,899,375 A | 2/1990 | Bauer et al. |
| 4,901,341 A | 2/1990 | Carter et al. |
| 4,908,852 A | 3/1990 | Hird et al. |
| 4,916,733 A | 4/1990 | Smith et al. |
| 4,920,562 A | 4/1990 | Hird et al. |
| 4,922,519 A | 5/1990 | Daudelin |
| 4,922,520 A | 5/1990 | Bernard et al. |
| 4,924,488 A | 5/1990 | Kosich |
| 4,924,501 A | 5/1990 | Cheeseman et al. |
| 4,932,062 A | 6/1990 | Hamilton |
| 4,933,966 A | 6/1990 | Hird et al. |
| 4,933,967 A | 6/1990 | Lo et al. |
| 4,935,956 A | 6/1990 | Hellwarth et al. |
| 4,937,856 A | 6/1990 | Natarajan |
| 4,937,862 A | 6/1990 | Kosich |
| 4,943,995 A | 7/1990 | Daudelin et al. |
| 4,944,001 A | 7/1990 | Kizuik et al. |
| 4,947,422 A | 8/1990 | Smith et al. |
| 4,947,425 A | 8/1990 | Grizmala et al. |
| 4,979,214 A | 12/1990 | Hamilton |
| 4,991,203 A | 2/1991 | Kakizawa |
| 4,993,062 A | 2/1991 | Dula et al. |
| 4,993,068 A | 2/1991 | Piosenka et al. |
| 5,003,595 A | 3/1991 | Collins et al. |
| 5,008,923 A | 4/1991 | Kitamura et al. |
| 5,020,095 A | 5/1991 | Morganstein et al. |
| 5,022,067 A | 6/1991 | Hughes |
| 5,023,869 A | 6/1991 | Grover et al. |
| 5,023,896 A | 6/1991 | Yokouchi et al. |
| 5,023,906 A | 6/1991 | Novas |
| 5,033,088 A | 7/1991 | Shipman |
| 5,054,059 A | 10/1991 | Stern et al. |
| 5,063,593 A | 11/1991 | Kwon |
| 5,093,858 A | 3/1992 | Hird et al. |
| 5,109,405 A | 4/1992 | Morganstein |
| 5,131,024 A | 7/1992 | Pugh et al. |
| 5,134,651 A | 7/1992 | Ortiz et al. |
| 5,150,357 A | 9/1992 | Hopner et al. |
| 5,153,907 A | 10/1992 | Pugh et al. |
| 5,155,761 A | 10/1992 | Hammond |
| 5,163,083 A | 11/1992 | Dowden et al. |
| 5,164,989 A | 11/1992 | Brandman et al. |
| 5,181,237 A | 1/1993 | Dowden et al. |
| 5,187,740 A | 2/1993 | Swaim et al. |
| 5,193,110 A | 3/1993 | Jones et al. |
| 5,200,995 A | 4/1993 | Gaukel et al. |
| 5,210,789 A | 5/1993 | Jeffus et al. |
| 5,216,702 A | 6/1993 | Ramsden |
| 5,218,636 A | 6/1993 | Hamilton |
| 5,220,501 A | 6/1993 | Lawlor et al. |
| 5,222,120 A | 6/1993 | McLeod et al. |
| 5,229,764 A | 7/1993 | Matchett et al. |
| 5,247,569 A | 9/1993 | Cave |
| 5,255,305 A | 10/1993 | Sattar |
| 5,274,698 A | 12/1993 | Jang |
| 5,276,731 A | 1/1994 | Arbel et al. |
| 5,283,825 A | 2/1994 | Druckman et al. |
| 5,283,829 A | 2/1994 | Anderson |
| 5,287,401 A | 2/1994 | Lin |
| 5,305,312 A | 4/1994 | Fornek et al. |
| 5,309,505 A | 5/1994 | Szlam et al. |
| 5,311,589 A | 5/1994 | Bennett et al. |
| 5,319,701 A | 6/1994 | Hird et al. |
| 5,319,702 A | 6/1994 | Kitchin et al. |
| 5,321,754 A | 6/1994 | Fisher et al. |
| 5,323,448 A | 6/1994 | Biggs et al. |
| 5,325,421 A | 6/1994 | Hou et al. |
| 5,325,427 A | 6/1994 | Dighe |
| 5,327,489 A | 7/1994 | Anderson et al. |
| 5,329,578 A | 7/1994 | Brennan et al. |
| 5,333,181 A | 7/1994 | Biggs |
| 5,335,266 A | 8/1994 | Richardson, Jr. et al. |
| 5,345,501 A | 9/1994 | Shelton |
| 5,345,595 A | 9/1994 | Johnson et al. |
| 5,351,285 A | 9/1994 | Katz |
| 5,351,287 A | 9/1994 | Bhattacharyya et al. |
| 5,355,403 A | 10/1994 | Richardson, Jr. et al. |

| | | |
|---|---|---|
| 5,369,699 A | 11/1994 | Page et al. |
| 5,375,161 A | 12/1994 | Fuller et al. |
| 5,381,474 A | 1/1995 | Lahdemaki et al. |
| 5,394,465 A | 2/1995 | Jo |
| 5,416,831 A | 5/1995 | Chewning, III et al. |
| 5,425,087 A | 6/1995 | Gerber et al. |
| 5,428,662 A | 6/1995 | Hamilton |
| 5,442,696 A | 8/1995 | Lindberg et al. |
| 5,450,485 A | 9/1995 | Hamilton |
| 5,452,347 A | 9/1995 | Iglehart et al. |
| 5,455,819 A | 10/1995 | Sugiyama |
| 5,461,665 A | 10/1995 | Shur et al. |
| 5,465,293 A | 11/1995 | Chiller et al. |
| 5,465,387 A | 11/1995 | Mukherjee |
| 5,471,519 A | 11/1995 | Howe et al. |
| 5,473,686 A | 12/1995 | Virdee |
| 5,483,582 A | 1/1996 | Pugh et al. |
| 5,483,593 A | 1/1996 | Gupta et al. |
| 5,485,507 A | 1/1996 | Brown et al. |
| 5,497,414 A | 3/1996 | Bartholomew |
| 5,504,810 A | 4/1996 | McNair |
| 5,524,141 A | 6/1996 | Braun et al. |
| 5,524,145 A | 6/1996 | Parker |
| 5,535,261 A | 7/1996 | Brown et al. |
| 5,539,812 A | 7/1996 | Kitchin et al. |
| 5,544,231 A | 8/1996 | Cho |
| 5,566,229 A | 10/1996 | Hou et al. |
| 5,577,116 A | 11/1996 | Townsend et al. |
| 5,583,920 A | 12/1996 | Wheeler, Jr. |
| 5,583,934 A | 12/1996 | Zhou |
| 5,606,604 A | 2/1997 | Rosenblatt et al. |
| 5,617,471 A | 4/1997 | Rogers et al. |
| 5,619,561 A | 4/1997 | Reese |
| 5,627,887 A | 5/1997 | Freedman |
| 5,634,126 A | 5/1997 | Norell |
| 5,651,056 A | 7/1997 | Eting et al. |
| 5,655,013 A | 8/1997 | Gainsboro |
| 5,682,386 A | 10/1997 | Arimilli et al. |
| 5,722,418 A | 3/1998 | Bro |
| 5,724,404 A | 3/1998 | Garcia et al. |
| 5,742,905 A | 4/1998 | Pepe et al. |
| 5,745,553 A | 4/1998 | Mirville et al. |
| 5,745,558 A | 4/1998 | Richardson, Jr. et al. |
| 5,757,781 A | 5/1998 | Gilman et al. |
| 5,768,355 A | 6/1998 | Salibrici et al. |
| 5,777,558 A | 7/1998 | Pennypacker et al. |
| 5,796,811 A | 8/1998 | McFarlen |
| 5,799,068 A | 8/1998 | Kikinis et al. |
| 5,805,685 A | 9/1998 | McFarlen |
| 5,809,125 A | 9/1998 | Gammino |
| 5,844,978 A | 12/1998 | Reuss et al. |
| 5,859,907 A | 1/1999 | Kawahara et al. |
| 5,862,519 A | 1/1999 | Sharma et al. |
| 5,867,559 A | 2/1999 | Jorgensen et al. |
| 5,875,230 A | 2/1999 | Ganley et al. |
| 5,883,945 A | 3/1999 | Richardson, Jr. et al. |
| 5,907,602 A | 5/1999 | Peel et al. |
| 5,923,746 A | 7/1999 | Baker et al. |
| 5,926,533 A | 7/1999 | Gainsboro |
| 5,937,042 A | 8/1999 | Sofman |
| 5,943,403 A | 8/1999 | Richardson, Jr. et al. |
| 5,946,386 A | 8/1999 | Rogers et al. |
| 5,960,064 A | 9/1999 | Foladare et al. |
| 6,031,895 A | 2/2000 | Cohn et al. |
| 6,052,454 A | 4/2000 | Kek et al. |
| 6,064,963 A | 5/2000 | Gainsboro |
| 6,072,860 A | 6/2000 | Kek et al. |
| 6,075,843 A | 6/2000 | Cave |
| 6,097,804 A | 8/2000 | Gilbert et al. |
| 6,134,320 A | 10/2000 | Swan et al. |
| 6,141,406 A | 10/2000 | Johnson |
| 6,169,789 B1 | 1/2001 | Rao et al. |
| RE37,073 E | 2/2001 | Hammond |
| 6,188,751 B1 | 2/2001 | Scherer |
| 6,249,570 B1 | 6/2001 | Glowny et al. |
| 6,320,946 B1 | 11/2001 | Enzmann et al. |
| 6,320,948 B1 | 11/2001 | Heilmann et al. |
| 6,324,280 B2 | 11/2001 | Dunn et al. |
| 6,363,065 B1 | 3/2002 | Thornton et al. |

| | | | |
|---|---|---|---|
| 6,366,653 B1 | 4/2002 | Yeh et al. | |
| 6,381,321 B1 | 4/2002 | Brown et al. | |
| 6,404,764 B1 | 6/2002 | Jones et al. | |
| 6,404,857 B1 | 6/2002 | Blair et al. | |
| 6,404,870 B1 | 6/2002 | Kia | |
| 6,445,682 B1 | 9/2002 | Weitz | |
| 6,480,590 B1 | 11/2002 | Ku | |
| 6,487,200 B1 | 11/2002 | Fraser | |
| 6,496,477 B1 | 12/2002 | Perkins et al. | |
| 6,529,500 B1 | 3/2003 | Pandharipande | |
| 6,529,602 B1 | 3/2003 | Walker et al. | |
| 6,553,336 B1 | 4/2003 | Johnson et al. | |
| 6,560,323 B2 | 5/2003 | Gainsboro | |
| 6,560,325 B2 | 5/2003 | Brown et al. | |
| 6,611,583 B1 | 8/2003 | Gainsboro | |
| 6,621,812 B1 | 9/2003 | Chapman et al. | |
| 6,654,722 B1 | 11/2003 | Aldous et al. | |
| 6,665,380 B1 * | 12/2003 | Cree et al. | 379/88.25 |
| 6,687,360 B2 | 2/2004 | Kung et al. | |
| 6,731,630 B1 | 5/2004 | Schuster et al. | |
| 6,788,775 B1 | 9/2004 | Simpson | |
| 6,795,444 B1 | 9/2004 | Vo et al. | |
| 6,816,469 B1 | 11/2004 | Kung et al. | |
| 6,876,647 B2 | 4/2005 | Celi, Jr. | |
| 6,904,139 B2 | 6/2005 | Brown et al. | |
| 6,920,209 B1 | 7/2005 | Gainsboro | |
| 6,985,478 B2 | 1/2006 | Pogossiants et al. | |
| 7,039,171 B2 | 5/2006 | Gickler | |
| 7,042,992 B1 | 5/2006 | Falcone et al. | |
| 7,046,782 B2 | 5/2006 | Miller | |
| 7,075,922 B2 | 7/2006 | Mussman et al. | |
| 7,085,359 B2 * | 8/2006 | Crites et al. | 379/112.01 |
| 7,203,186 B1 | 4/2007 | Fuller et al. | |
| 7,248,680 B1 * | 7/2007 | Gainsboro | 379/189 |
| 7,302,053 B2 | 11/2007 | Chang et al. | |
| 7,333,798 B2 | 2/2008 | Hodge | |
| 7,360,087 B2 | 4/2008 | Jorgensen et al. | |
| 7,360,090 B1 | 4/2008 | Doskow et al. | |
| 7,505,406 B1 | 3/2009 | Spadaro et al. | |
| 7,505,409 B2 | 3/2009 | DeCusatis et al. | |
| 7,529,357 B1 | 5/2009 | Rae et al. | |
| 2001/0028649 A1 | 10/2001 | Pogossiants et al. | |
| 2001/0036821 A1 | 11/2001 | Gainsboro et al. | |
| 2001/0041590 A1 | 11/2001 | Silberfenig et al. | |
| 2001/0047333 A1 | 11/2001 | Kim et al. | |
| 2002/0071537 A1 | 6/2002 | Gainsboro | |
| 2002/0141386 A1 | 10/2002 | Minert et al. | |
| 2002/0159440 A1 | 10/2002 | Mussman et al. | |
| 2002/0176403 A1 | 11/2002 | Radian | |
| 2003/0002639 A1 | 1/2003 | Huie | |
| 2003/0023714 A1 | 1/2003 | Ziegler et al. | |
| 2003/0041326 A1 * | 2/2003 | Novak et al. | 725/25 |
| 2003/0091028 A1 | 5/2003 | Chang et al. | |
| 2003/0126470 A1 | 7/2003 | Crites et al. | |
| 2003/0133558 A1 | 7/2003 | Kung et al. | |
| 2003/0185204 A1 | 10/2003 | Murdock | |
| 2003/0198325 A1 * | 10/2003 | Bayne | 379/114.21 |
| 2004/0052218 A1 | 3/2004 | Knappe | |
| 2004/0181433 A1 * | 9/2004 | Blair | 705/2 |
| 2006/0209797 A1 | 9/2006 | Anisimov et al. | |
| 2006/0285650 A1 | 12/2006 | Hodge | |
| 2006/0286962 A1 | 12/2006 | Davis | |
| 2007/0041545 A1 | 2/2007 | Gainsboro | |
| 2007/0071206 A1 | 3/2007 | Gainsboro et al. | |
| 2007/0115924 A1 | 5/2007 | Schneider et al. | |
| 2007/0242658 A1 | 10/2007 | Rae et al. | |
| 2007/0263812 A1 | 11/2007 | Polozola et al. | |
| 2008/0040780 A1 | 2/2008 | Reinhold | |

FOREIGN PATENT DOCUMENTS

| | | |
|---|---|---|
| EP | 0814583 A2 | 12/1997 |
| EP | 1175074 | 1/2002 |
| FR | 2600850 | 12/1987 |
| GB | 2134749 A | 8/1984 |
| JP | 5-30193 | 2/1993 |
| JP | 63-03305 | 10/1994 |
| JP | 63-033054 | 12/1994 |
| JP | 2002/157327 A | 5/2002 |
| JP | 2002157627 | 4/2003 |

| | | |
|---|---|---|
| JP | 2003110758 | 4/2003 |
| WO | WO 96/20448 A1 | 7/1996 |
| WO | WO 97/22208 A2 | 6/1997 |
| WO | WO 98/13993 A1 | 4/1998 |
| WO | WO 00/54491 A1 | 9/2000 |

OTHER PUBLICATIONS

Bahl, L. "A Maximum Likelihood Approach to Continuous Speech Recovery," Readings in Speech Recognition, Ed. A. Waibel and K. Lee, Morgan Kaufmann Publishers, pp. 308-319, IEEE 1983.

Batten, A. "Personal Communications Service and the Intelligent Network," British Telecommunications Engineering, vol. 9, pp. 88-91, Aug. 1990.

"BubbleLINK® Software Architecture," SciDynTM, The Voice of IP TechnologyTM, [online] [Retrieved on Nov. 4, 2005], Retrieved from: http://www.scidyn.com/products/BubbleLink%20White.pdf.

"Call Control—Commander II," SciDynTM Products, [online] [Retrieved on Nov. 4, 2005], Retrieved from : http://www.scidyn.com/products/commander2.html.

DPD/120-JP Product on Display at Communications Tokyo '01, Apr. 2-5, 1991 (Product described in U.S. Patent No. 5,218,636).

European Examination Report, EP07251570.3, May 29, 2008, 5 pages.

LazerVoice, Digital Recording System Inmate Services, 1997-1998, Schlumberger Technologies, Inc. / LazerVoice STIL V0222 LazerVoice User's Manual—Version 2.22, pp. 1-41, published Apr. 28, 1998 by Schlumberger Technologies, Inc./LazerVoice of Mobile, Alabama.

"LazerPhone Inmate Telephone System, Users Manual version 1.0," pp. 1-29, published Oct. 1998 by Schlumberger Technologies, Inc./ Global Tel*Link of Mobile, Alabama.

LazerPhone, Powerful Performance Uncompromising Standards, 1998.

Lee, K., "Large-Vocabulary Speaker-Independent Continuous Speech Recognition Using HMM," Carnegie Mellon University Department of Electrical and Computer Engineering, CMU-CS-88-148, Apr. 1988.

Manual for "DPD/120-JP Dial Pulse Detection Board," Dialogic Systems Ltd., Tokyo, Japan, (Product described in U.S. Patent No. 5,218,636), undated.

OSSGR, vol. 3, "Feature Specific Documents," Technical Ref. TSY-000271 FSD 85-01-0100 Calling Card Service—Published by Bell Communications Research-Revision #3, Dated Mar. 1988.

OSSGR, vol. 3, "Feature Specific Documents," Technical Ref. TSY-000271 FSD-85-01-0200 Collect Billing—Published by Bell Communications Research-Revision #3 Dated Mar. 1988.

PCT International Search Report, PCT/US99/09493, Aug. 20, 1999, 5 pages.

PCT Written Opinion, PCT/US99/09493, Feb. 9, 2000, 12 pages.

"PPCS (Prison Prepaid Card System)", DiaVox Technologies, Inc., Nov. 2000, 10 pages.

Scidyn Commander 3-Way Call Detection System [online] [Retrieved on Jun. 20, 2006] Retrieved from: http://www.scidyn.com/products/Commander%203-way%20Detection.pdf, 5 pages.

"ShoreTel: Intelligent Phone Systems, Products," Internet Brief, 4 pgs. Retrieved on Nov. 4, 2005, Retrieved from : http://www.shoretel.com/STCorp/products/architecture/aspx.

"SciDynVoIP Technology Now Available for Call Control Solutions," SciDyn™ Press Release, [online] [Retrieved on Nov. 4, 2005], Retrieved from : http://www.scidyn.com/news/pr/0122pr.html.

"Smart Features for Optimizing Your Network," SciDynTM BubbleLINK®, [online] [Retrieved on Nov. 4, 2005], Retrieved from: http://www.scidyn.com/products/bubble.html.

"System 20" Value Added Communications (VAC), Nov. 1992, Brochure (4 pages).

Telematic "ConQuest III Inmate Telephone System," Nov. 1992.

Thermos, P., "Two Attacks Against VoIP," Security Focus, XP-002444627, Apr. 4, 2006, pp. 1-8.

U.S. Appl. No. 09/229,385, Cree et al., filed Jan. 1999.

U.S. Appl. No. 09/640,831, Swope et al., Entitled "System and Method for Reverse Billing for Telephone Call," filed Aug. 17, 2000.

U.S. Appl. No. 09/905,014, Spadaro et al., Entitled "Public Telephone Control with Voice Over Internet Protocol Transmission," filed Jul. 13, 2001.

U.S. Appl. No. 09/955,253, Lord, Entitled "Method and Apparatus for Exchange Data Between a Primary Computer System to Ensure Transactional Reconciliation Between the Systems," filed Nov. 27, 2001.

U.S. Appl. No. 10/022,946, Draizin et al., Entitled "A Method for Determining an Entity Responsible for Billing a Called Party," filed Dec. 17, 2001.

U.S. Appl. No. 10/135,878, Viola et al., Entitled "Information Management and Movement System and Method," filed Apr. 29, 2002.

U.S. Appl. No. 10/190,315, Falcone et al., Entitled "Systems and Methods for Offering a Service to a Party Associated with a Blocked Call," filed Jul. 3, 2002.

U.S. Appl. No. 10/252,956, Lord, Entitled "Three-Way Telephone Call Prevention System and Method," filed Sep. 20, 2002.

U.S. Appl. No. 10/135,883, Falcone et al., Entitled "Optimizing Profitability in Business Transactions," filed Nov. 25, 2003.

U.S. Appl. No. 10/437,839, Hite et al., Entitled "Intelligent Queuing of Transaction Records," filed May 14, 2003.

U.S. Appl. No. 10/360,248, Falcone et al., Entitled "Systems and Methods for Account Establishment and Transaction Management Using Interrupt Messaging," filed Feb. 7, 2003.

U.S. Appl. No. 10/360,442, Falcone et al., Entitled "Systems and Methods for Transactions Authorization Determination," filed Feb. 7, 2003.

U.S. Appl. No. 10/420,585, McNitt et al., Entitled "System and Method for Detecting Unauthorized Call Activity,".

U.S. Appl. No. 10/642,532, Rae et al., Entitled "Centralized Cell Processing," filed Aug. 15, 2003.

U.S. Appl. No. 10/646,638, filed Aug. 22, 2003.

U.S. Appl. No. 10/800,473, Rae et al., Entitled "Call Processing with Voice Over Internet Protocol Transmission," filed Mar. 15, 2004.

U.S. Appl. No. 11/777,168, Rae et al., Entitled "Inmate Management and Call Processing Systems and Methods," filed Jul. 12, 2007.

"VoIP the Evolving Solution and the Evolving Threat," Internet Security Systems, Inc., XP-002444626, 2004, pp. 1-7.

United States Office Action, U.S. Appl. No. 09/905,014, Apr. 19, 2005, 19 pages.

United States Office Action, U.S. Appl. No. 09/905,014, Jan. 9, 2006, 22 pages.

United States Office Action, U.S. Appl. No. 09/905,014, Sep. 14, 2006, 23 pages.

United States Office Action, U.S. Appl. No. 09/905,014, Mar. 22, 2007, 25 pages.

United States Office Action, U.S. Appl. No. 09/905,014, Sep. 12, 2007, 29 pages.

United States Office Action, U.S. Appl. No. 09/905,014, Mar. 17, 2008, 27 pages.

United States Office Action, U.S. Appl. No. 10/800,473, Nov. 28, 2007, 20 pages.

United States Office Action, U.S. Appl. No. 10/800,473, Sep. 5, 2008, 22 pages.

United States Office Action, U.S. Appl. No. 10/800,473, Apr. 16, 2009, 32 pages.

United States Office Action, U.S. Appl. No. 11/777,168, Apr. 8, 2008, 12 pages.

United States Office Action, U.S. Appl. No. 11/777,168, Oct. 29, 2008, 5 pages.

United States Office Action, U.S. Appl. No. 11/777,168, Nov. 20, 2008, 5 pages.

United States Office Action, U.S. Appl. No. 10/800,473, Mar. 24, 2010, 32 pages.

United States Office Action, U.S. Appl. No. 10/642,532, Jan. 6, 2010, 17 pages.

United States Office Action, U.S. Appl. No. 11/403,547, Dec. 30, 2009, 5 pages.

European Extended Search Report, European Application No. 07251570.3, Aug. 20, 2007, 7 pages.

U.S. Appl. No. 11/403,547, filed Apr. 13, 2006.

United States Office Action, U.S. Appl. No. 10/642,532, Mar. 20, 2008, 26 pages.

United States Office Action, U.S. Appl. No. 10/642,532, Nov. 7, 2008, 16 pages.
United States Office Action, U.S. Appl. No. 10/642,532, Feb. 23, 2009, 15 pages.
United States Office Action, U.S. Appl. No. 10/642,532, Sep. 9, 2009, 18 pages.
United States Office Action, U.S. Appl. No. 10/800,473, Dec. 23, 2010, 31 pages.
United States Office Action, U.S. Appl. No. 10/642,532, Jul. 21, 2010, 19 pages.
United States Office Action, U.S. Appl. No. 11/403,547, Jun. 23, 2010, 5 pages.
United States Office Action, U.S. Appl. No. 10/800,473, Aug. 30, 2010, 33 pages.
U.S. Office Action, U.S. Appl. No. 10/800,473, Nov. 17, 2009, 33 pages.

* cited by examiner

INMATE MANAGEMENT AND CALL PROCESSING SYSTEMS AND METHODS

CROSS-REFERENCE TO RELATED APPLICATIONS

This application is a continuation of U.S. patent application Ser. No. 11/777,168 entitled "Inmate Management System and Call Processing Systems and Method," filed Jul. 12, 2007, which is a continuation-in-part of U.S. patent application Ser. No. 10/642,532 entitled "Centralized Call Processing," filed on Aug. 15, 2003. This Application is related to co-pending and commonly assigned U.S. patent application Ser. No. 10/135,878 entitled "Information Management and Movement System and Method," filed Apr. 29, 2002, Ser. No. 10/135,883 entitled "Optimizing Profitability in Business Transactions," filed Apr. 29, 2002, Ser. No. 10/190,315 entitled "System and Methods for Offering a Service to a Party Associated with a Blocked Call," filed Jul. 3, 2002, Ser. No. 09/640,831 entitled "System and Method for Reverse Billing of a Telephone Call," filed Aug. 17, 2000, Ser. No. 10/022,946 entitled "Method for Determining an Entity Responsible for Billing a Called Party," filed Dec. 17, 2001, Ser. No. 10/217,149 entitled "System and Method for Call Treatment," filed Aug. 12, 2002, Ser. No. 10/252,956 entitled "Three-Way Telephone Call Prevention System and Method," filed Sep. 20, 2002, Ser. No. 09/995,253 entitled "Method and Apparatus for Exchanging Data Between a Primary Computer System and an External Computer System to Ensure Transaction Reconciliation Between the Systems," filed Nov. 27, 2001, Ser. No. 10/360,248 entitled "System and Method for Account Establishment and Transaction Management Using Interrupt Messaging," filed Feb. 7, 2003, Ser. No. 10/360,442 entitled "Systems and Methods for Transaction Authorization Determination," filed Feb. 7, 2003, Ser. No. 10/437,839 entitled "Intelligent Queuing of Transaction Requests," filed May 14, 2003, Ser. No. 10/420,585 entitled "System and Method for Detecting Unauthorized Call Activity," filed Apr. 22, 2003, Ser. No. 10/602,233 entitled "System and Method for Transaction and Information Management," filed Jun. 24, 2003, Ser. No. 10/640,505 entitled "Called Party Controlled Message Delivery," filed Aug. 13, 2003, Ser. No. 10/720,732 entitled "Information Management and Movement System and Method," filed Nov. 24, 2003, Ser. No. 10/828,735 entitled "Systems and Methods for Real-Time Obligation Search, Payment, and Update," filed Apr. 21, 2006, Ser. No. 10/836,976 entitled "Systems and Methods for Transaction and Information Management," filed Apr. 30, 2004, Ser. No. 10/720,848 entitled "Information Management and Movement System and Method," filed Nov. 24, 2003, Ser. No. 10/952,327 entitled "Systems and Methods for Management and Dissemination of Information for Controlled Environment Facility," filed Sep. 28, 2004, Ser. No. 11/182,625 entitled "Systems and Methods for Acquiring, Accessing, and Analyzing Investigative Information," filed Jul. 15, 2005, and Ser. No. 10/800,473 entitled "Call processing with Voice over Internet Protocol Transmission," filed on Mar. 15, 2004, the disclosures of which are hereby incorporated herein by reference.

TECHNICAL FIELD

The present invention relates generally to information systems, and more particularly, to systems and methods for inmate management and call processing.

BACKGROUND OF THE INVENTION

Considerable time and expense are involved in accepting an inmate at a controlled environment facility. In most cases, an individual may be first identified on the street by a member of the police department as having an outstanding warrant for arrest, or may otherwise be taken into custody by police or an officer of the court. The arresting officer may then complete some paperwork identifying the individual, describing the reason for arrest or detention, list any impounded property, etc. This initial information may be collected, for instance, in a patrol car or the like. Thereafter, the arrestee may be transported to a local controlled environment facility such as, for example, police stations, department of corrections, juvenile facilities, municipal or county jails, etc., for further processing and/or incarceration.

In general, there is a period of time when the arrestee is temporarily incarcerated in a controlled environment facility but has not been fully processed as an inmate thereof. For example, the arrestee may have been photographed, fingerprinted, and entered into an initial set of books at the facility, but he or she may not yet have been arraigned (i.e., brought before a judge to hear the charges and to set bail). Before being fully processed into the controlled environment facility, an arrestee may go through a classification process, medical examination, hygienic processing (e.g., shower and delousing), etc. In connection with these procedures, staff members may be required to complete a file in an inmate management system.

In some situations, the arrestee may be placed in a temporary holding cell. Often the law requires that arrestees be given access to a telephone for placing one or more calls to seek assistance from someone outside of the controlled environment facility, such as a friend or family member, an attorney, a bail bondsman, etc. Today, local controlled environment facilities such as police stations and the like may not monitor, control, or even charge for those calls, particularly when the calls originate from holding cells. Typically, only the first call made by the arrestee must be provided free of charge. Nonetheless, local facilities do not ordinarily have the means to charge for subsequent calls, or even limit the amount of calls made a particular arrestee. As a result, the arrestee's phone calls are often provided as free service and without any control or monitoring.

Furthermore, after the arrestee becomes an inmate of a first controlled environment facility, he or she is oftentimes transferred to a second such facility. These transfers may take place, for example, based on the expected length of incarceration, jurisdiction where the crime took place, type of crime committed, etc. For instance, an inmate may be temporarily held at a local police station, and then moved to a county jail. After residing within the county jail for a period of time, the inmate may then be moved to a state or federal prison. Today each police, county, state, and federal authority implements its own inmate data collection and management system. Therefore, at each step in the inmate's incarceration history beginning with his or her arrest up until his or her last transfer, redundant information is gathered and processed by each facility. The information collected by these different facilities is not connected in any way, and investigators must visit or contact each such entity when seeking information related to a single case or person.

BRIEF SUMMARY OF THE INVENTION

The present invention is directed to systems and methods that provide centralized or nodal inmate management and telephone call processing capabilities to controlled environment facilities and law enforcement agencies. In one embodiment, an inmate management and call processing system of the present invention serves a plurality of controlled environment facilities such as, for example, police stations, detention centers, juvenile facilities, county and municipal jails, state penitentiaries, federal prisons, and the like. The inmate management and call processing system preferably includes an inmate information database to provide data aggregation and sharing capabilities across several facilities, in addition to call processing functionality.

Each controlled environment facility may utilize the inmate management and call processing system to store, retrieve, and/or modify a record associated with an arrestee or inmate in the inmate information database. To that end, high bandwidth persistent data connections may be provided between the controlled environment facilities and the inmate management and call processing system for data processing use, such as by management terminals and/or other data processing systems (e.g., commerce computer systems, justice application management computer systems, various peripheral devices, etc.) disposed at the facilities.

When a person is arrested for the first time, an inmate record may be created that comprises a code, personal identification number (PIN), or some other form of identification (e.g., uniquely generated code, biometrics, etc.) that is associated with him or her. Alternatively, if the arrestee has been arrested before, the arresting office may retrieve an existing record and update that record with new information. In some embodiments, another code or number may be created for the particular incident giving rise to the arrest, and that incident may be linked to the arrestee. An arresting officer or law enforcement staff collects personal and/or incident-related information from the arrestee and adds that information to an inmate record. In one embodiment, the inmate record includes a list of third parties connected with the arrestee (e.g., family, friends, attorneys, etc.) along with their contact information. After the record is stored in the inmate management and call processing system, the system may proactively operate to notify one or more of those third parties about the arrest (e.g., by telephone, email, or the like).

In one embodiment, the inmate management and call processing system of the present invention establishes an account associated with a third party whose contact information is reflected in the inmate's record. The account may be a prepaid account, a post-paid account, a debit account, a credit account, or the like. To set up the account, the inmate management and call processing system may request additional information directly from the third party, for example, during the arrest and/or transfer notification process. In one embodiment, the inmate management and call processing system establishes a first account for telephone calls and/or transactions (e.g., purchasing of commissary items) made by the inmate while the inmate is at a first controlled environment facility (e.g., municipal jail). In another embodiment, the inmate management and call processing system may create a second account or update the first account upon the inmate's transfer to a second controlled environment facility (e.g., county jail).

Moreover, as the arrestee is moved or transferred among different controlled environment facilities (e.g., from police department to county jail), the receiving facility may access the inmate management and call processing system and retrieve the inmate's record from the inmate database. The receiving facility may also modify the inmate's record and/or add data collected upon the inmate's arrival and/or during his or her stay. In this manner, an inmate's entire incarceration history beginning with his or her arrest is maintained in a centralized or nodal database. As such, the inmate management and call processing systems provides for data sharing, aggregation, and/or analysis across multiple facilities served, whether affiliated (such as facilities of a particular city, county, or state or facilities having an association, e.g., sheriff's association) or non-affiliated (such as all facilities served by the service provider). Information, such as inmate booking information, dossiers, etc., may be shared across several facilities.

In one embodiment, the inmate management and call processing system of the present invention also provides call processing, video conferencing, e-mail, videomail, and/or voicemail applications, and the like to one or more of the plurality of controlled environment facilities that it serves. Data connections between the controlled environment facilities and the inmate management and call processing system may also carry telephone call content. For example, Voice over Internet Protocol (VoIP) may be utilized to carry calls from a location at which calling services are provided to an inmate management and call processing system providing all or substantially all call processing functionality, such as calling party identification, call validation, call routing, connection to the public switched telephone network (PSTN), call recording, etc. Additionally or alternatively, calls may be placed on a network at the facility. For instance, a call processor box at the facility may operate in cooperation with the inmate management and call processing system of the present invention.

Preferred embodiments of the present invention provide devices having relatively limited or specialized functionality, such as VoIP gateways or integrated access devices (IADs) (collectively referred to herein in centralized call processing configurations as call processing gateways), at controlled environment facilities for which calling services are provided. These call processing gateways are preferably utilized to provide plain old telephone service (POTS) analog line interfaces for use with a plurality of telephone sets disposed for use at the facility and at least one wide area network (WAN) interface for providing high speed data communication to an inmate management and call processing system. Call processing gateways utilized according to the present invention may provide additional interfaces, such as a local area network (LAN) for connecting systems such as management terminals to the gateway and/or inmate management and call processing system and/or switched network interfaces such as to couple PSTN lines directly to the gateway, if desired.

Call processing gateways of embodiments of the invention become the collection point for calls and data for a particular facility and provide a link to one or more central sites for call processing and other functionality. For example, one centralized inmate management and call processing system may be implemented with respect to a plurality of facilities serviced. Additionally or alternatively, a plurality of inmate management platforms, such as might be deployed regionally and/or to provide redundancy, may be networked to a plurality of facilities serviced. WAN circuits may be purchased from a carrier for connecting each individual facility to the inmate management platform or platforms. The WAN circuits may be purchased according to the bandwidth capacity desired for each corresponding facility, e.g., to provide less bandwidth where few telephone terminals are deployed at a facility and more bandwidth where many telephone terminals are deployed at another facility. The WAN circuits may be collected together as they proceed through a carrier's network, thereby providing a larger aggregate data pipe or pipes at an inmate management and call processing system.

Inmate management and call processing systems of preferred embodiments of the present invention comprise high capacity and high speed routing/switching functionality, such as a router and gigabit Ethernet switch, to facilitate low latency data communication between call processing functionality and/or PSTN interfacing functionality of the call processing gateways of a plurality of facilities. Call processing functionality of embodiments of an inmate management and call processing system may be provided by a plurality of servers operable under control of instruction sets defining operation to provide call processing features such as calling party identification, call validation, call routing, etc. PSTN interfacing functionality of embodiments of an inmate management and call processing system may be provided as a data connection (e.g., media gateway control protocol (MGCP) or session initiation protocol (SIP)) to the PSTN. Additionally or alternatively, PSTN interfacing functionality of embodiments of an inmate management platform may be provided as POTS trunking or other more traditional telephone line interface. Preferred embodiments, however, may place calls on the PSTN in VoIP protocols to receive the benefit of such advantages as lower connection cost offered by the carrier when introduced to the PSTN in VoIP protocols, reduced latencies associated with repeated conversion of the call between VoIP and analog protocols, and improved call quality associated with carrying the call in digital format closer to the called party before conversion back to analog.

Inmate management and call processing systems of the present invention may implement outbound dialer and/or interactive voice response (IVR) features, such as to solicit information from a caller, to provide call status announcements, to solicit funds for a call, etc. These outbound dialer and/or IVR features may be used to notify persons of the arrestee's incarceration status and/or of an inmate's transfer among different facilities ahead of time. Additionally or alternatively, centralized inmate management and call processing systems of the present invention may implement call recording and/or other centralized data collection, such as through use of a storage area network (SAN), interconnected redundant array of inexpensive disks (RAID) or fixed disk platforms, and/or the like. In this manner, initial calls made by arrestees from controlled environment facilities may be recorded for later investigative uses. Similarly, information, such as called party number, uncollectable call statistics, usage frequency or velocity, etc., may be aggregated and/or analyzed across facilities.

Inmate management and call processing systems of certain embodiments of the present invention implement a data structure for segmenting calling activity for each individual facility to control access with respect to each facility's data and/or to facilitate independent accounting, maintenance, and other functionality, thereby providing, in some respects, a virtual facility call processor with respect to facilities. For example, administrative personnel of a particular facility are preferably enabled to perform maintenance and other operations (e.g., call processor configuration, recorded call playback, billing and commission record access, etc., with respect to that particular facility). According to a preferred embodiment, management terminals disposed locally at a facility are provided data access to portions of the call processing platforms relevant to the operation of that facility via the aforementioned call processing gateway, such that it appears from the user's viewpoint as if a local call processor system is being accessed and maintained. Additionally or alternatively, independent WAN connections with respect to such management terminals may be supported according to embodiments of the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
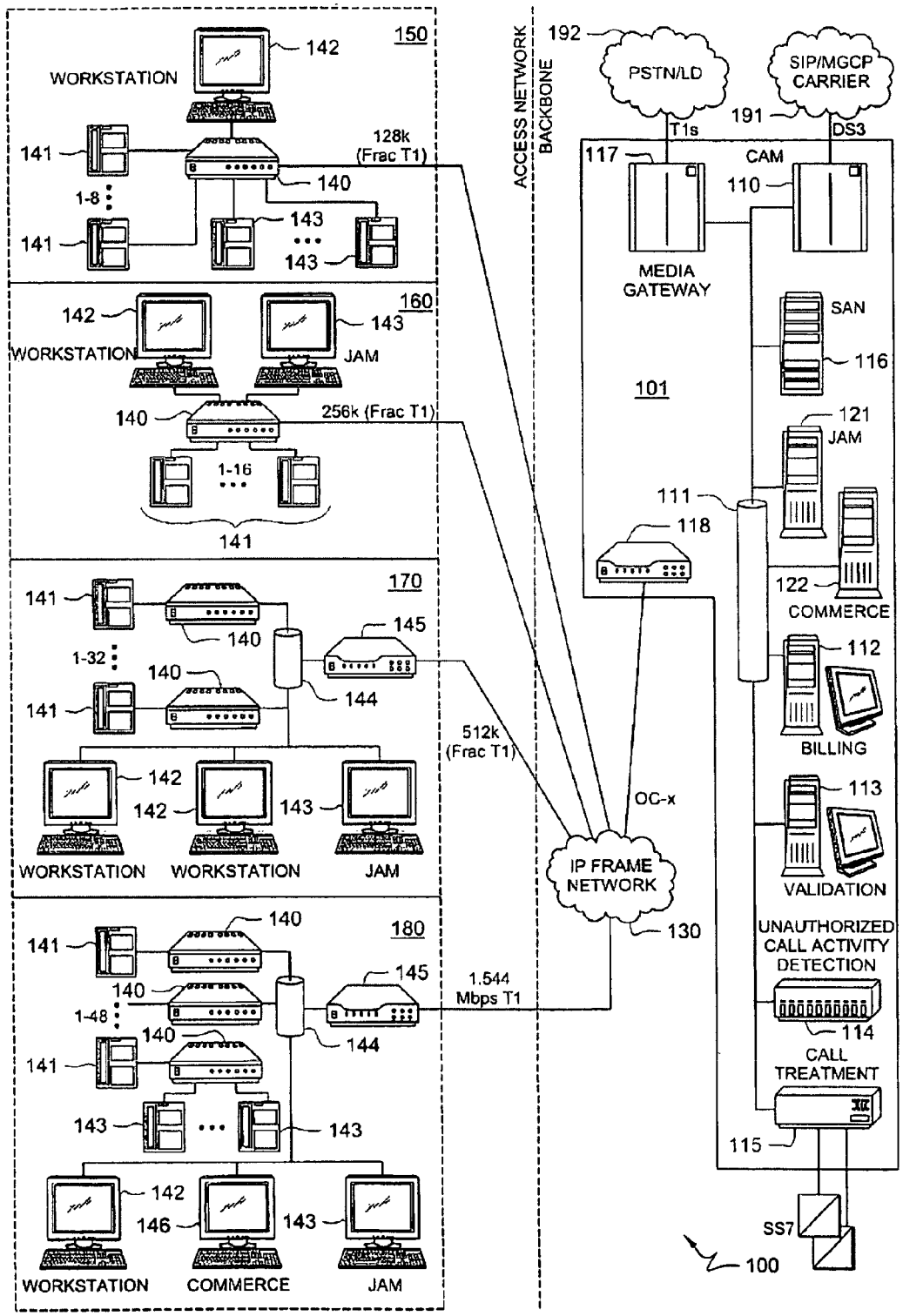
FIG. 1 shows an inmate management and call processing system according to an embodiment of the present invention.

Directing attention to FIG. 1, an embodiment of a centralized or nodal inmate management and call processing system according to the present invention is shown as system 100. System 100 of the illustrated embodiment includes computer-based platform 101 in communication with facilities 150-180 via network 130. It should be appreciated that, although only a single computer-based platform 101 is represented in FIG. 1, any number of such systems, perhaps having varied configurations and/or disposed at different geographic locations, may be implemented with respect to an inmate management and call processing system 100 of the present invention. Likewise, the number and configurations of facilities for which calling services may be provided by an inmate management and call processing system of the present invention is not limited to that shown in FIG. 1.

To better aid the reader in understanding the concepts of the present invention, system 100 of FIG. 1 is described herein with reference to its configuration and use in providing calling services to jail or prison facilities. However, it should be appreciated that call processing systems of the present invention are not limited to use with respect to such facilities. Embodiments of the present invention may be utilized with respect to any number of controlled environment facilities (e.g., prisons, hospitals, nursing homes, camps, dormitories, and the like) or other locations (e.g., businesses, residences, kiosks, etc.). The terms "inmate" and "arrestee" are used interchangeably in the present disclosure to describe persons who are temporarily or permanently residing in controlled environment facilities.

Certain embodiments of the present invention dispose one or more call processing gateways, shown here as call processing gateways 140, at or near sites for which inmate management and call processing services are to be provided, here facilities 150-180. Call processing gateways 140 may provide interfacing and arbitration between a number of protocols, signals, and/or interfaces. For example, preferred embodiment call processing gateways 140 provide a plurality of analog telephone line interfaces (e.g., POTS line interfaces) for coupling to a plurality of telephone terminals 141 and providing loop current, dial tone, etc. thereto. Preferred embodiment call processing gateways 140 further provide at least one WAN interface (e.g., T1 interface) for coupling to a data, e.g., packet switched, network. Call processing gateways 140 of this preferred embodiment provide conversion of analog signals associated with telephone terminals 141 and visitation telephones 143 and digital data packets of the packet switched network to provide a VoIP gateway. Call processing gateways 140 may include additional or alternative interfaces, such as LAN interfaces (e.g., 100 Mbit Ethernet interface), wireless interfaces (e.g., 802.11 interface), etc., if desired. Embodiments of the present invention utilize commercially available devices, such as the IAD 2400 series of integrated access devices available from Cisco Systems, Inc., San Jose, Calif., in providing a call processor gateway.

It should be appreciated that communications provided by call processing gateways 140 utilized according to the present invention are not limited to communication between devices implementing different protocols and/or signals. For example, communications between a plurality of telephone terminals disposed within a particular facility, e.g., visitation telephones 143 shown in facilities 150 and 180, may be provided by call processing gateways 140 of the present invention. Although not requiring signal/protocol conversion to facilitate communication between two such similarly configured devices, call processing gateways 140 of the present invention are preferably leveraged to provide such communication arbitration, e.g., analog to VoIP and VoIP to analog functionality, to provide a data stream to computer-based platform 101 containing the communication content between such terminals, such as to provide word search and/or call recording as will be described further below.

A plurality of call processing gateways 140 may be disposed with respect to a particular facility, if desired. For example, a plurality of call processing gateways 140 may be coupled to cooperate in providing call processing services using a network 144. A network router or switch, such as router 145, may be utilized in coupling call processing gateways 140 to computer-based platform 101 via network 130. Router 145 of preferred embodiments may provide communication security, such as in the form of firewall protection, if desired. Of course, other components, such as call processing gateway 140, may be configured to provide communication security in addition to or in the alternative to router 145.

A particular configuration and/or number of call processing gateways 140 utilized with respect to any of facilities 150-180 is preferably selected as a function of the facility's configuration. Depending upon the number of telephone terminals 141 to be provided calling services and/or the number of visitation telephones 143 at a particular facility (typical facilities may have from two telephones to approximately 600 telephones phones or more based on the physical size of the location), a configuration of call processing gateways 140 and/or a number of call processing gateways 140 deployed may be selected having more or less analog telephone line interfacing capacity. Similarly, depending upon the communication volume expected to be utilized at a particular facility, a configuration of call processing gateways 140 and/or a number of call processing gateways 140 deployed may be selected providing more or less bandwidth with respect to a WAN interface thereof. Where local management terminals (e.g., workstations 142) or other data processing equipment (e.g., justice application management 143 and/or commerce system 146) is to be provided WAN access at a particular facility, a configuration of call processing gateways 140 may be selected to provide a LAN interface and/or appropriate WAN bandwidth.

The bandwidth of a connection between a particular facility and network 130 provided by a carrier access network may be scaled to correspond to an expected communication volume. For example, where relatively few telephone terminals 141 and/or visitation telephones 143 are present and management terminal or other data processing equipment communication is expected to be relatively low, a lower bandwidth connection (e.g., fraction of T1 or, perhaps in cases where reliability is not an issue, digital subscriber line (DSL) such as asynchronous DSL (ADSL) high bit rate DSL (HDSL) etc. (referred to collectively as xDSL) or cable modem technology) may be provided. However, where a large number of telephone terminals 141 and/or visitation telephones 143 are present and/or management terminal or other data processing equipment communication is expected to be relatively high, a higher bandwidth connection (e.g., T1 or DS3) may be provided. These data links may be aggregated as they pass through the carrier's access network, thereby providing a larger bandwidth aggregated connection or connections (e.g., OC3 or OCX) from network 130 to computer-based platform 101.

The data links between call processing gateways 140 and computer-based platform 101 are preferably packet switched links, such as those provided using various IP or frame relay protocols. However, any type of data connectivity protocol that may be relied upon to deliver VoIP and data packets may be utilized according to embodiments of the present invention. Embodiments of the present invention may utilize carrier access network and backbone network links implementing protocols such as Ethernet, asynchronous transfer mode (ATM), synchronous optical network (SONET), and the like.

Computer-based platform 101 of the illustrated embodiment includes router/switch 118 coupling network 130 to various systems and components comprising computer-based platform 101 via network 111. Router/switch 118 of preferred embodiments may provide communication security, such as in the form of firewall protection, if desired. Of course, other components, such as validation system 113, may be configured to provide communication security in addition to or in the alternative to router/switch 118.

The illustrated embodiment of computer-based platform 101 includes a number of functional aspects, ones of which may be omitted in optional configurations, shown as various systems cooperating to provide call processing according to embodiments of the present invention. Call application management system 110, billing system 112, validation system 113, unauthorized call activity detection system 114, call treatment system 115, call recording system 116, and media gateway 117 may be utilized in various combinations to provide primary calling service functionality according to embodiments of the present invention. Justice application management system 121 and/or commerce system 122 of computer-based platform 101 may be utilized in providing inmate management functionality as will be described further below. It should be appreciated that, although the illustrated embodiment is described with reference to a justice application management system providing enhanced functionality with reference to use in providing calling services to jail or prison facilities, embodiments of the present invention may implement information management systems useful with respect to a variety of applications, such as hospital management, business management, demographic collection and/or analysis, usage statistics, etc. Accordingly, justice application management system 121 as shown in FIG. 1 may correspond to any number of information management systems providing data collection and/or sharing among facilities as described herein.

Call application management system 110 of the preferred embodiment, as may comprise one or more processor-based servers as are well known in the art, forms the heart of call processing functionality provided by inmate management and call processing system 100. For example, preferred embodiments of call application management system 110 control completing a call between a party using any one of telephone terminals 141 or visitation telephones 143 and another party, such as may be using one of visitation telephones 143 or a telephone terminal (not shown) coupled to computer-based platform 101 via SIP/MGCP network 191 or PSTN 192. Additionally or alternatively, call application management system 110 may include outbound dialer, interactive voice response (IVR), text-to-speech, voice recognition, and/or dual tone multi-frequency (DTMF) recognition/ generation functionality such as may be useful for playing announcements to various ones of the calling and called parties, soliciting information (such as personal identification numbers (PINs), account numbers, called number, etc.) from the parties, signaling other systems, etc.

Detail with respect to operation in providing call processing by a call application manager according to embodiments of the present invention is shown in the above referenced patent application entitled "Information Management and Movement System and Method." However, call application management system 110 of the embodiment illustrated in FIG. 1 herein provides a data interface coupling call application management system 110 to facilities 150-180 via network 130 and providing VoIP communication therebetween. Additionally, call application management system 110 of FIG. 1 provides a data interface coupling call application management system 110 to user terminals (e.g., telephone terminals, not shown) via SIP/MGCP network 191 and providing VoIP communication through the carrier network to a point more near the user terminal. Accordingly, call application manager 110 of a preferred embodiment need not implement analog voice cards for interfacing with particular user terminals and need not convert between digital and analog signal formats when providing communication between particular users.

Call processing platforms of the present invention are not limited to operation in the digital domain. Accordingly, the illustrated embodiment of computer-based platform 101 includes media gateway 117 in communication with call application management system 110 via network 111. Media gateway 117 of a preferred embodiment, as may comprise one or more processor-based servers having analog voice cards as are well known in the art, provides interfacing and arbitration between a number of protocols, signals, and/or interfaces, such as to facilitate communications between digital VoIP protocols present on network 111 and analog protocols present on PSTN 192. Using media gateway 117, call application management system 110 may provide communications to user terminals (e.g., telephone terminals, not shown) via PSTN 192.

However, it should be appreciated that providing communication to a carrier in digital format, such as SIP or MGCP, may provide several advantages. For example, research has revealed that considerable cost advantages with respect to carrying the traffic through the public network may be realized when the communications are provided to the network in a digital format. The cost savings have been found to be significant with respect to interstate and interlata calls, such as on the order of $0.05 to $0.02 per minute. Additionally, issues of latency in processing digitally processed calls may be avoided by providing communication to a carrier in digital format by avoiding repeated conversion between digital and analog formats. Call quality may be improved through the use of digital communication in as much of the communication link as is possible, thereby avoiding signal degradation typically inherent in analog communication networks.

Embodiments of call processing platforms of the present invention are preferably coupled to multiple carriers (whether through POTS links, digital links, etc.) to allow switching connections to be made by the call processing platform based upon considerations such as least cost routing, rate changes, regulatory issues, reliability issues, and/or the like. Call application management system 110 of one embodiment may make determinations with respect to a particular carrier network to utilize in connecting a calling party to a called party on a call by call basis or in response to a particular event. Preferred embodiments of the present invention provide the ability to switch quickly between available carriers in response to an event, such as a service disruption or rate change. In contrast, distributed call processing system architectures typically require a long period of coordination, physical dispatch, and often the implementation of different hardware to facilitate a switch between particular carriers providing calling connections.

Additionally or alternatively, call application management system 110 may cooperate with other systems to provide robust call processing functionality. For example, call application management system 110 may cooperate with validation system 113 and/or unauthorized call activity detection system 114 to provide call intelligence for use in determinations with respect to allowing a particular call to be continued. According to one embodiment, unauthorized call activity detection system 114 provides real-time intelligence with respect to fraudulent or otherwise unauthorized activity being attempted during a call. For example, unauthorized call activity detection system 114 may employ silence detection techniques to identify attempts at establishing an unauthorized three-way call. Detail with respect to detecting unauthorized call activity is provided in the above referenced patent applications entitled "Three-Way Telephone Call Prevention System and Method" and "System and Method for Detecting Unauthorized Call Activity."

Call recording system 116 of the illustrated embodiment, as may comprise a SAN providing large amounts of data storage (e.g., terabytes), is coupled to call application management system 110 and operates under control thereof to store information with respect to calls. Information stored by call recording system 116 may comprise the content of the call, i.e., record the conversation or exchange of data provided by the call. Additionally or alternatively, information stored by call recording system 116 may comprise ancillary call information, such as identification of the calling and/or called party, calling number (e.g., automatic number information (ANI)), called number (e.g., dialed number information service (DNIS)), time of call, duration of call, account information, entity responsible for billing the call, and/or the like. Although the content of a call may be recorded in an analog format, preferred embodiments of the present invention record the content in a digital format to readily facilitate retrieval and/or playback via digital means, such as upon workstations 142 via network 130.

According to embodiments of the invention, call application management system 110 may signal call recording system 116 to record or not record particular calls processed by computer-based platform 101. For example, all calls placed from any of facilities 150-180 to any party except an attorney representing a party to the call may be recorded by call recording system 116. It should be appreciated that, as the content of the call is provided in digital form, packets may readily be routed not only between a call processing gateway 140 and call application management system 110 for placing parties in communication, but also between call processing gateway 140, call application management system 110, or router 118 and call recording system 116 for archiving the content of the call.

Call processing gateways 140 of embodiments of the invention provide digital data streams including the content of calls not necessarily processed by computer-based platform 101 to facilitate recording of those calls by call recording system 116. For example, although call application management system 110 may not be involved in a particular call between visitation telephones 143 of a facility, except perhaps to initially allow the connection and/or establish a time limit or other parameters for the connection, a data stream containing the content of the call may continue to be provided from a call processing gateway 140 to computer-based platform 101 to facilitate archiving of the call content by call recording system 116.

It should be appreciated that disposing call recording system 116 at the centralized location associated with computer-based platform 101 according to preferred embodiment provides several advantages. For example, infrastructure, such as the aforementioned SAN, which otherwise would be cost prohibitive to deploy with respect to a facility may be utilized in an optimized fashion. Moreover, individual facilities need not implement backup procedures for the archiving of recorded calls, thereby not only avoiding the administrative burden but quite likely avoiding the need for additional information technology personnel.

Call recording system 116 of embodiments of the present invention may provide functionality in addition to or in the alternative to archiving call content. For example, call recording system 116 may comprise processor-based functionality to analyze the content of calls for investigative or other purposes, such as to recognize particular words and phrases. Such word search functionality may cooperate with investigative functionality, as may be provided by justice application management system 121, to alert investigators of a potential threat associated with a caller's utterance of words such as "kill," "bomb," or particular names such as that of a victim or judge. Further detail with respect to investigative uses of such word search functionality as well as investigative functionality which may be provided using a call processor is shown in the above referenced patent application entitled "Information Management and Movement System and Method."

Validation system 113, as may comprise one or more processor-based servers as are well known in the art, may operate to make determinations with respect to allowing a particular call to be completed and/or continued. For example, validation system 113 may cooperate with call application management system 110 when a call is initiated to verify the identity of the calling party, that the calling party is authorized to place a call, that the called party will receive calls or is authorized to receive calls from the calling party, that the calling party and/or called party have not exceeded a particular velocity of calls or a preselected value point (e.g., billing limit), that an identified prepaid account has sufficient monies to fund the call, that, in the case of a collect call, a billing arrangement exists between an entity responsible for billing calls to the called party and the service provider and that the called party presents an acceptable collection risk, etc. Detail with respect to call validation functionality is provided in the above referenced patent applications entitled "Information Management and Movement System and Method," "Optimizing Profitability in Business Transactions," "System and Methods for Offering a Service to a Party Associated with a Blocked Call," and "Systems and Methods for Transaction Authorization Determination."

It should be appreciated that the validation process as provided by validation system 113 of a preferred embodiment provides improved validation determination response as compared to a typical distributed validation scheme. For example, where a distributed architecture is utilized, validation often requires a call processor local to the calling party to establish a link with one or more centralized clearing houses or other databases to perform a validation. However, the centralized configuration of the inmate management and call processing architecture of FIG. 1 provides for communication between application management system 110 and validation system 113 locally, using packet transmissions, thereby facilitating improved validation determination responsiveness.

Additionally or alternatively, validation system 113 may cooperate with other systems to provide enhanced call validation. For example, validation system 113 may cooperate with call treatment system 115 to provide call intelligence for use in the aforementioned determinations with respect to allowing a particular call to be completed and/or continued. Accordingly, robust information, perhaps including information harvested from a signaling network, such as the signaling system 7 (SS7) network, may be utilized in call processing by computer-based platform 101 of a preferred embodiment. For example, determinations with respect to a call forwarding feature being activated for a called number may be made from information available from SS7 data and, thus, validation system 113 may utilize this information in a determination as to whether the call should be completed. Detail with respect to use of call intelligence for use in making determinations with respect to the treatment of calls is shown in the above referenced patent application entitled "System and Method for Call Treatment."

Additionally or alternatively, validation system 113 may cooperate with other systems of inmate management and call processing system 100 to provide robust call processing functionality. For example, when identifying a call going to a certain telephone number, rather than blocking the call attempt, validation system 113 may cooperate with justice application management system 121 to notify an investigator that a call was made to that telephone number and/or to forward the call content for monitoring purposes to an investigator's telephone (e.g., cell phone or office phone) number. Detail with respect to such intelligence functionality is provided in the above referenced patent application entitled "Information Management and Movement System and Method."

Billing system 112, as may comprise one or more processor-based servers as are well known in the art, may operate to provide accounting, billing, and/or reconciliation of charges for calling and other services provided by call processing system 100. For example, billing system 112 may cooperate with call application management system 110 to collect billing information with respect to calls processed by call processing platform 101. This information may be used in real-time to deduct monies from prepaid accounts associated with a party to the call, to compile call detail records for out-clearing to local exchange carriers providing service to a called party, to provide direct billing by the service provider, etc. Detail with respect to accounting, billing, and reconciliation functionality is provided in the above referenced patent applications entitled "Information Management and Movement System and Method," "System and Method for Reverse Billing of a Telephone Call," "Method for Determining an Entity Responsible for Billing a Called Party," and "Method and Apparatus for Exchanging Data Between a Primary Computer System and an External Computer System to Ensure Transaction Reconciliation Between the Systems."

Additionally or alternatively, billing system 112 may cooperate with other systems to provide robust call processing functionality. For example, billing system 112 may cooperate with validation system 113 to provide billing information or portions thereof for use in the aforementioned determinations with respect to allowing a particular call to be completed and/or continued. As a specific example, debit card amounts may be debited real time by billing system 112 and the debit card threshold monitored by validation system 113 to shut off a call immediately upon crossing the debit card threshold. Accordingly, real-time, dynamic control of call processing services may be provided by embodiments of the present invention without the delay associated with periodic polling of distributed and/or discrete systems.

Billing system 112 of embodiments of the present invention implements various functionality to facilitate the performance of revenue producing services and/or to optimize the amounts of revenues and/or profits attained. For example, billing system 112 may cooperate with validation system 113 and/or call application management system 110 to solicit funds from a party or create a prepaid account when a collection risk is determined to be unacceptably high or monies are not otherwise available to fund a call. Accordingly, embodiments of the present invention provide the ability to set up a call account real-time, e.g., when a caller picks up a telephone terminal in a served facility but has not already established a way to bill the call. Detail with respect to such functionality is shown in the above referenced patent application entitled "System and Method for Account Establishment and Transaction Management Using Interrupt Messaging."

Billing system 112 may additionally or alternatively provide intelligent management of accounts receivable, such as to hold out-clearing of call detail records to local exchange carriers to consolidate call charges on billing statements, to maintain visibility and control with respect to accounts, to allow flexibility in account collection, etc. Detail with respect to intelligent account management functionality is shown in the above referenced patent application entitled "Intelligent Queuing of Transaction Requests."

It should be appreciated that, because computer-based platform 101 of the preferred embodiment provides call processing with respect to a plurality of facilities, embodiments of the present invention include the capability to segment the data being stored in relation to each facility. For example, all of the calling records, all the call recordings, system parameters and configuration settings, etc. may be tagged or otherwise associated with the facility to which it belongs. Using such information, system 100 of a preferred embodiment is able to control access to the data when a user logs onto the central data from a facility, based on their logon ID information, where they are logging in from, or other information. A user logging on from a particular facility may be provided only information associated with that facility for which their logon ID provides them access. For example, a user at workstation 142 at facility 180 may be provided access to play recorded calls made from facility 180, provided that user's logon ID permits such activity. Similarly, a user at workstation 142 at facility 160 may be allowed to change configuration settings, such as pre-selected value points establishing billing limits, blocked telephone numbers, etc., affecting operation of call processing platform 101 with respect to facility 160, provided that user's logon ID permits such activity. Of course, using appropriate security protocols, users are not limited to data access to the call processing platform from terminals disposed at the various facilities and, therefore, may access aspects of the systems from other remote locations.

It should be appreciated that a virtual local facility call processor system is provided using the aforementioned management terminals disposed locally at a facility and coupled to the centralized call processing platform via a data connection. Accordingly, a facility can enjoy the benefits of having a call processor system without the full expense of such systems. For example, in the illustrated embodiment, a facility may have only a few telephone terminals, a general purpose computer system for use as a management terminal, and a data network connection coupled to a call processing gateway in order to receive the benefits of a full featured call processing system of the present invention. Expansion and updating of such a call processing system with respect to each facility is highly simplified as most updates and expansions may be accomplished centrally, at the call processing platform, without direct involvement of the facility or its personnel. Where the facility or its personnel are involved in an expansion or update, such as to increase communication capacity, the level of such involvement is insubstantial, such as to deploy additional call processing gateways, connect additional telephone terminals thereto, and provide a network connection.

In certain embodiments of the present invention, the centralized configuration of inmate monitoring and call processing system 100 may be utilized to provide data sharing, aggregation, and/or analysis across a plurality of controlled environment facilities.

According to one such embodiment, particular facilities, such as facilities within a same county or state are provided shared data access to collect intelligence, to improve facility management, to minimize administrative burden, etc.

Using the data management techniques and user interfaces described herein, inmate monitoring and call processing system 100 may allow segmented views into an inmate management database. An inmate management database may comprise one or more data centers containing information about inmates, arrestees, incidents, visitors, or other groups of interest. Further, the inmate management database may be managed by justice application management system 121 or by a dedicated inmate management system (not shown) similar to justice application management system 121. For example, the inmate management database may be implemented within justice application management system 121, or call recording system 116, or the dedicated inmate management system.

In one illustrative embodiment, facility 150 may be a local police department and facility 170 may be a municipal or city jail to which inmates temporarily held at the police department are transferred. For example, police department computers may connect to router 118 via network 130 using a DSL connection, a telephone-level connection (e.g., when the phone goes off hook it may ring into a 1-800 number which allows a data call to be processed as a regular telephone call), etc. Upon connection with computer-based platform 101, the querying and maintenance of information stored in the inmate management database and managed, for example, by justice application management system 121, may be provided through graphical user interfaces (GUIs) or the like.

It should be appreciated that access to data made available by call processing systems of the present invention is not limited to data connections from a facility site, such as WAN connections from workstations 142 to computer-based platform 101. For example, access to such data may be provided via an application service provider (ASP) type configuration, such as may be provided via the Internet. An ASP hosting site may be collocated with other functional aspects of a call processing platform of the present invention or could be hosted at other locations, such as using WAN connections to computer-based platform 101.

Certain embodiments of the present invention enable a police officer or law enforcement personnel to search for a warrant for an individual (e.g., at a traffic stop or the like). If an outstanding warrant is found during a database search, the officer may make an initial determination of whether or not to arrest the individual. Following arrest, the database is preferably updated, in real-time, in such a manner that the satisfied status of the obligation is synchronized across the state, county or other jurisdiction. This procedure eliminates the problem of having the same party being pulled over twice and/or jailed for an outstanding warrant previously taken care of, as detailed in the above referenced co-pending patent application entitled "Systems and Methods for Real-Time Obligation Search, Payment, and Update."

If the officer decides to arrest the individual, the inmate or an arrestee is typically picked up by a police squad car (or any other mobile police station), and inmate and/or incident records may be created and retrieved from the squad car even before the arrestee reaches police department 150. When information is retrieved and/or collected from a squad car, transmission of data between the squad car and inmate management database of computer based-system 101 may utilize a cellular or wireless links into router/switch 118 via network 130. As such, the interfaces provided according to the present invention may be varied depending upon the individual given access and/or the functionality available to the individual. Therefore, access to the inmate management database may be had via computer systems (local and/or remote) personal digital assistants (PDAs), pagers, and telephones (wireline and/or wireless) to facilitate input of data, querying of data, notification of events or conditions, etc.

During a booking procedure according to one example, police personnel may first search inmate records within an inmate management database coupled to computer-based platform 101, such as within justice application management system 121, to determine whether a particular arrestee has already been assigned an inmate number or code as a result of prior arrests. If an inmate number exists for that arrestee, his or her record is retrieved from the inmate management database and may be modified to include new or updated information about the inmate. Similarly, police personnel may search incident records within the inmate management database to determine whether the incident giving rise to the arrest has already been catalogued with a corresponding incident number, and may create such an incident number if the search does not return satisfactory results. Moreover, police personnel may also associate the existing inmate record with the incident record.

If the arrestee does not yet have an inmate number associated with him or her, the inmate may be uniquely coded, such as by assigning a inmate number or using other information (e.g., driver's license number and/or social security number), and may be given a machine readable version of that code (e.g., a barcoded wristband). Additionally or alternatively, biometric data, such as may be collected at the time of arrest or otherwise, may be implemented in uniquely identifying inmates. Furthermore, an incident record having an incident number containing information related to the events giving rise to the arrest may be created, linked to the inmate's record, and stored in the inmate management database.

In one embodiment, the inmate record contains information related to the inmate such as physical description, social security number, driver's license number, impounded property, biometric data, etc. Examples of biometric data include voice print, finger print, iris and/or retina scan, hand scan, face and/or personal physical attribute recognition, and the like. This data may be collected through the use of fingerprint readers, hand scanners, cameras, microphones, iris and/or retina scanners, and/or the like. In such embodiments, police department 150 may be equipped with biometric interfaces for use in collecting appropriate biometric data for use in connection with the inmate management and call processing system 100. For example, a personal computer, PDA, and/or telephone terminal utilized according to the present invention may be equipped with a camera, whether still or moving image, to capture an image of a user's face or other physical attribute. It should be appreciated that the aforementioned camera (and similarly, microphones) utilized for collection of biometric data need not be uniquely adapted for biometric data processing and, therefore, may be readily available for use according to the present invention. Further, police department 150 may also be equipped with a card scanner for reading the arrestee's driver's license or the like.

The inmate record may also contain information related to the arrest such as the date of the arrest, reasons for the arrest, the identity of the arresting officer, the identity of other persons arrested in connection with the same incident, etc. In addition to the foregoing, the inmate record may comprise the contact information of third parties known to the inmate (e.g., family members, friends, attorneys, etc.) such as their names, physical addresses, telephone numbers, and e-mail addresses, or the like. Third party contact information may have been originally collected, for example, for the purpose of determining who to contact in case of an emergency, who will post bail, or who will retrieve the arrestee's personal effects, etc. Once collected, however, this information may be advantageously used for additional purposes consistent with the present invention. For example, third party contact information may be utilized by computer-based platform 101 to notify the third party of the inmate's incarceration and/or transfer between different facilities, and also to establish one or more accounts for telephone usage and other transactions (e.g., purchasing of commissary items) made by the inmate while residing in a particular facility. In this manner, while the inmate benefits from having the third party automatically notified of his or her status, the controlled environment facility also benefits from having an inmate account set up to maximize its revenues. These features are described in more detail with respect to FIG. 2 below.

While at police department 150, the inmate may be placed in a temporary holding cell or the like. A plurality of arrestees or inmates may be incarcerated in the same holding cell, from which they may be allowed to make phone calls. Ordinarily, it would be impossible to determine if any particular detainee has accessed a telephone disposed in the holding cell, much less monitor or record those calls. This is unfortunate given that phone calls made from a holding cell or booking phone often have the most important investigative value because they are most likely to contain confessions to family members, requests to co-conspirators, and the like. However, using the systems and methods described herein, all calls made by an inmate may be linked to the inmate's record via the inmate's PIN or code, and their contents may be recorded by call recording system 116 for later investigative uses. For example, the inmate may be required to input his or her PIN number before being allowed to dial the phone. Additionally or alternatively, a biometric device may be coupled to the phone to authorize calls. Therefore, all calls made by the inmate may be associated with him or her and/or charged to the account previously established for the inmate. Additionally or alternatively, records of each call may be kept and then billed when an account is eventually set up. These calls may be further processed by the call processing systems described herein to implement call restrictions, recording, monitoring, warnings, and other functions.

Records stored into the inmate management database are accessible to a plurality of controlled environment facilities such as, for example, county and municipal jails, state penitentiaries, federal prisons, and the like. Therefore, when an inmate is transferred from local police department facility 150 to jail 170, the inmate's unique code (such as might be scanned from the aforementioned barcoded wristband) may be utilized to populate a database entry of facility 170, such as within justice application management system 121 of computer-based platform 101 and/or justice application management system 143 of facility 170. Accordingly, the administrative time associated with soliciting and entering such information is foregone, and the additional opportunity for data entry error is avoided.

When the inmate arrives at the county jail, the jail may supplement the inmate record with information used specifically by this facility, information useful in housing the inmate for a long period of time, etc. For example, jail staff may collect additional information about the inmate, including personality traits, medical requirements, criminal charges, etc. to perform a classification procedure (e.g., to determine whom the inmate may be safely housed) or the like. Throughout the inmate's incarceration, visitation records containing the name of the visitor and time/duration of visit may be created and linked to the inmate record. Other records that may be associated with the inmate include, for example, call records, medical records, and the like. Accordingly, jail staff may periodically retrieve and update the inmate's record from the inmate management database of system 100. Moreover, each record within the inmate management database may have a "history" associated therewith, so that the history of all additions, deletions, and modifications made to an inmate (or incident) record is kept (e.g., time of modification, name of facility making the modification, name of staff within the facility, etc.).

Advantages in the sharing, aggregation, and/or analysis of data extends beyond the situation where associated or otherwise affiliated facilities share data. Where a large number of facilities are coupled to a centralized call processing system of the present invention, such data sharing, aggregation, and/or analysis provides appreciable advantages in conducting investigative operations. For example, an appreciable amount of homeland security intelligence may be gleaned from data derived from all of the inmates and all of the facilities, such as all of their calling records, all of their calling patterns, all of their call recordings, etc., which might be scrubbed and parsed to find patterns indicative of particular activities. Furthermore, although the inmate transfers described above are "vertical" transfers (e.g., police department to county jail), a person of ordinary skill in the art would immediately recognize that the data sharing, aggregation, and/or analysis functionality described herein is equally advantageous in situations involving "horizontal" transfers (e.g., between two county jails) or "intra-facility" transfers.

It will be recognized that some of the information collected during a specific procedure and/or period of incarceration may be useful only to a particular controlled environment facility (e.g., the cell number where the inmate is held). Therefore, not all information contained in an inmate record may be of value to a subsequent facility where the inmate may be eventually transferred to. Accordingly, in one embodiment of the present invention, each controlled environment facility may have the ability supplement existing inmate records with their own information and/or customize views into each record so that preferably only information fields that have particular relevance are shown.

Figure 2:
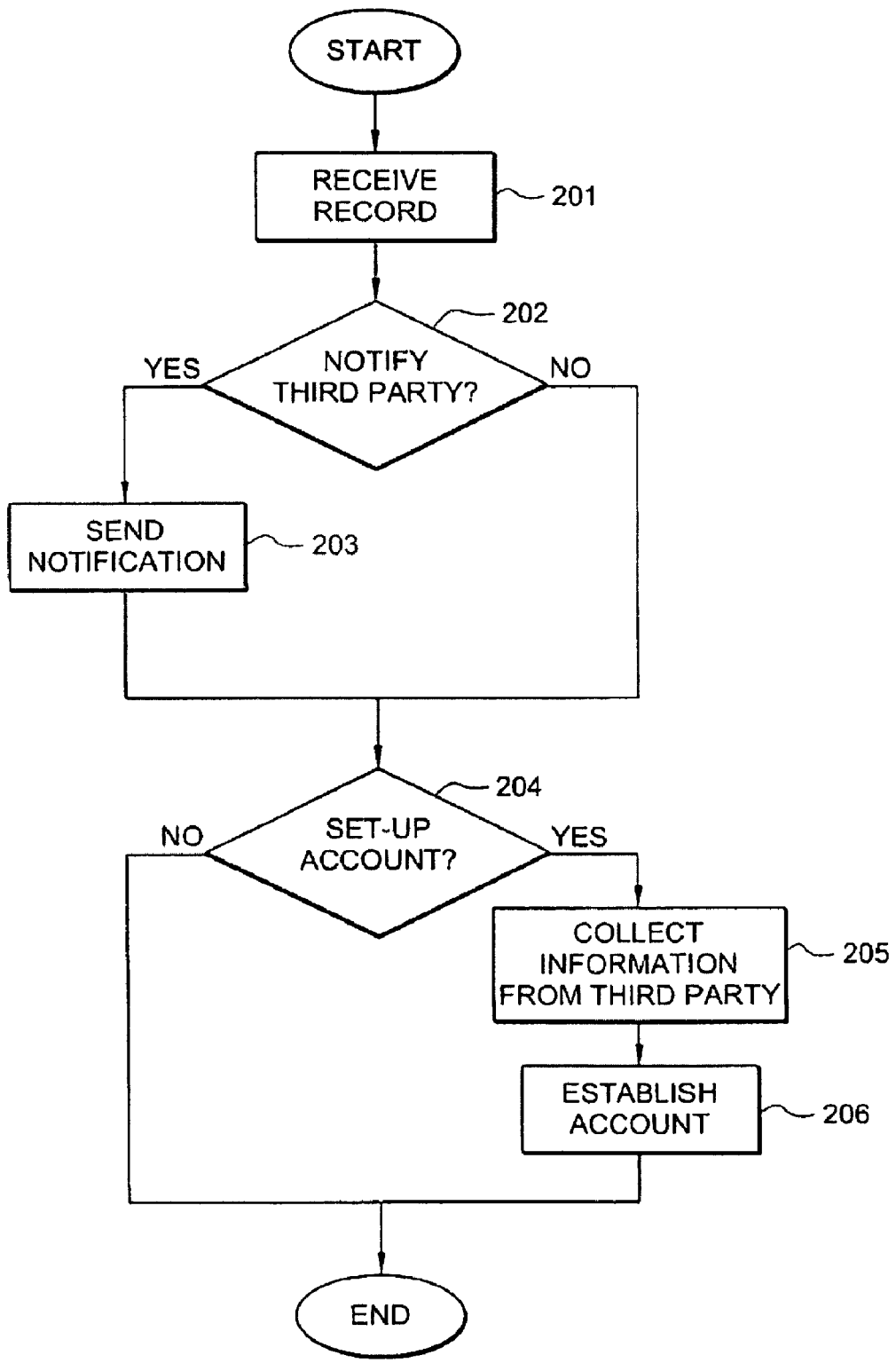
FIG. 2 shows a flow diagram of an exemplary notification and account set-up method utilizing the inmate management and call processing system of FIG. 1 according to an embodiment of the present invention.

Turning now to FIG. 2, a flow diagram of an exemplary inmate processing method according to an embodiment of the present invention is shown. In step 201, information collected by an arresting and/or booking officer regarding an arrestee is received at inmate management system or justice application management system 121 of computer-based platform 101 to create an inmate record in an inmate management database. In step 202, the inmate record is analyzed to identify whether any third parties should be notified of the arrest. In some embodiments, third parties are notified of the arrest when the inmate has given consent to the notification. Additionally or alternatively, notification is sent when authorized or required by law. As such, a notification is sent in step 203, otherwise the method proceeds to step 204. For example, this notification may be performed utilizing outbound calling and/or IVR functionality of call application management system 110 to make a call to the third party, by sending an automatically generated e-mail to the third party, or the like. The contents of such notification may include, for example, the name of the inmate, the date and place of the arrest, and the place where the inmate can be found for visitation purposes, if applicable. In one embodiment, different information is delivered to different types of third parties as authorized by the arrestee and/or required by law.

In step 204, the inmate record is again analyzed to identify whether any third parties should be contacted to set up an inmate account. Again, this determination may be made, for example, when the arrestee gives consent and/or when authorized by law Inmate accounts may be pre-paid, post-paid, debit, and/or a credit accounts which may be used to charge the cost telephone calls and/or the purchase of commissary items to the third party. To establish the account in step 206, inmate management and call processing system 100 may request information from the inmate's contact, for example, again utilizing IVR functionality of call application management system 110.

In one alternative embodiment, steps 202 and 204 may be performed simultaneously so that the establishment of an inmate account may be attempted during the notification process and/or upon arrest. Further, as noted above, inmates are frequently transferred among different controlled environment facilities. For instance, the same account created upon arrest or while the inmate is incarcerated at a first controlled environment facility may continue to be used when the inmate is later transferred to a subsequent facility. Alternatively, additional inmate accounts are set up, preferably ahead of the transfer.

In another embodiment, third party information may be collected by a police officer upon arrest of the inmate, and a corresponding account may be set up quickly enough for the inmate to be able use that account immediately upon arrival at the police department. When the initially provided third party contact information does allow the system to create an account (e.g., wrong third party phone number, etc.), or when the account set up process does not take place quickly enough for immediate use (e.g., third party must wire funds from a bank account into the inmate account), a booking officer later has the opportunity to correct the problem at the police department. In this manner, the later created inmate account may be used as a post-paid account to pay for calls and services previously consumed by the inmate (and kept track of by the police department) during the period of detention at the police department. In any event, the third party information collected upon arrest and during booking may be used to expedite account set up when the inmate is transferred from the police department to a city jail. Furthermore, even when the account set up process is not sufficiently fast, all the information collected may still expedite account set up when the inmate is transfer from the city jail to a county jail, or in subsequent transfers.

Inmate management and call processing system 100 may operate to set up a debit account, such as within billing and/or commerce system 122 of computer-based platform 101, where the inmate, or family and friends thereof, may deposit funds. The funds of an inmate debit account may later be utilized for such services as placing telephone calls from within the controlled environment facility. Anytime an inmate makes a call, they may be required to utilize their PIN and/or some other identifier such as the aforementioned biometric information, otherwise the call may be blocked and/or monitored. An account associated with the PIN or biometric data may then be accessed to determine if funds are available for placing the call. Such a determination may include analysis of information such as the dialed number (such as for call rate information) and perhaps historical information, such as the average length of a call to this number by the inmate. If sufficient funds are available the call may be placed, and preferably is continuously monitored so as to release the call if the account funds are exhausted during the call and/or to provide investigative information as described above. However, if sufficient funds are not available, the call may be blocked.

If insufficient funds are present in an inmate's account or an inmate does not have an account, operation of the present invention may attempt to obtain alternate funding for the desired service. For example, call application management system 110 of inmate management and call processing system 100 may place a call to a third party associated with the inmate and/or account allowing them to replenish or establish the account on behalf of the inmate if they desire to receive the phone call. For example, when a call is blocked call application management system 110 may place an automated call to the called party asking if they would like to accept the call and, if so, providing instructions as to how funding for the call may be provided. The called party may be allowed to input credit card information over the telephone for replenishing the inmate's account, for example. Additionally or alternatively, various retail or other geographically disbursed locations, such as grocery stores, check cashing facilities, rent-to-own stores, telegraph offices, money order sellers, and the like, may be enabled to accept payment for an account, thereby providing convenience to a cash paying party. Systems and methods for obtaining such funds are detailed in the above referenced co-pending patent application entitled "Optimizing Profitability in Business Transactions."

Similarly, if insufficient funds are present in an inmate's account or an inmate does not have an account, operation of the present invention may allow post paid funding for goods and/or services. For example, a credit risk analysis may be performed with respect to the called party to determine if billing as a collect call is acceptable. Systems and methods for providing such reversed charges for calls as well as for making a credit worthiness determination are shown and described in the above referenced co-pending patent applications entitled "System and Method for Reverse Billing of a Telephone Call" and "Optimizing Profitability in Business Transactions."

It should be appreciated that operation of the present invention as described above establishes a relationship with both the calling and called parties. For example, call application management system 110 may provide detailed information such as what called party an inmate calls, when they get calls, and how many times they are called. Additionally, information may be obtained as to the creditworthiness of the called party, how they pay, when they pay, etc. This information may be utilized according to the present invention in a number of ways, such as to provide better service to the inmate and/or called party.

For example, many inmate facilities have a commissary, which provides goods to the inmates in exchange for money. A non-inmate, such as a party which has been called by an inmate, may be enabled to open a deposit account and/or refill the account on behalf of the inmate for charging the purchases by that inmate. The inmate may utilize this account for purchasing goods and/or services for the inmate's benefit or for the benefit of others. For example, the commissary service or an external service in communication with the information management system may allow an inmate to select a gift, such as a bouquet of flowers, for delivery to a loved one on a special occasion. Moreover, information available to the information management system, such as an inmate's birthday and the fact that he has called a particular individual a number of times, may be utilized to contact the particular individual and market items for the benefit of the inmate and/or the individual. Furthermore, such a system may be utilized to simplify the process for bail payments by enabling friends or family to deposit money into the account easily. For example, a family member may deposit cash through any of the aforementioned retail or other locations or by using a credit card, such as over the phone.

It should be appreciated that additional advantages of embodiments of a centralized call processing system are exemplified in the foregoing example. Enhanced features may be provided with respect to a facility which might not otherwise have the funding or work load to fully justify the expense for the corresponding infrastructure. For example, justice application management, which may comprise a back office software product for a jail to facilitate management of the inmates in the facility (e.g., what cells they are assigned to, what medications are to be administered to them, tracking their medical records, tracking their privileges, etc.), management of facility personnel (e.g., scheduling working hours, tracking vacation days, administering benefits, etc.), management of facility resources (e.g., scheduling use of vehicles and conference rooms, establishing telephone availability schedules, etc.), and/or providing intelligence functionality (e.g., investigative analysis of call and money flow data, analyzing call and commerce transaction velocity, etc.), may be highly desirable to all of facilities 150-180 but economically out of reach of all but the largest of these facilities. However, because a plurality of facilities are served, infrastructure costs may be spread across a number of such facilities to make it practical to provide such enhanced features to any or all facilities.

Moreover, although larger facilities are free to take advantage of such shared infrastructure, embodiments of the present invention accommodate distributed deployment of such infrastructure, such as where a facility has a legacy system in place or where a facility has a sufficient work load to justify local deployment of particular infrastructure. In the case where justice application management system 143 is disposed locally with respect to a facility, embodiments of the present invention may provide backhauling of data to the centralized call processing platform for backup purposes, for centralized storage, for sharing, etc. Additionally or alternatively, the data network provided by inmate management and call processing system 100 may be utilized to link two or more justice application management systems 143 for sharing of data between facilities. The data connections via network 130 of the illustrated embodiment facilitate sharing of data in any of the foregoing configurations.

It should be recognized that many features provided by certain embodiments of the present invention are highly beneficial to penal institutions at every level of government. By using the systems and methods described herein, city and municipal jails i.e., "lower-level" facilities) may promote themselves in the community as institutions that are concerned with the well-being of their inmates (i.e., they provide notifications to family members, set up inmate accounts, etc.). In addition, city jails can take advantage of revenue opportunities that did not previously exist. City jails may also take advantage from automation and call control features not otherwise available to them. Meanwhile, county jails (i.e., "higher-level" facilities) benefit insofar the administrative burdens associated with inmate and data management are reduced (e.g., they may access inmate information previously entered by lower-level facilities upon arrest, booking, temporary incarceration, etc.). County jails also benefit from having accounts set up for their prospective inmates in advance of their transfer from the municipality, thus increasing revenues and minimizing potential losses. These and other mutual benefits should induce lower- and higher-level facilities to work together and share some of the costs of obtaining and installing the systems described herein.

Enhanced functionality provided by embodiments of centralized call processing systems of the present invention is not limited to the aforementioned justice application management functionality. For example, in addition to or in the alternative to justice application management system 121 disposed at a call processing platform of the present invention, commerce system 122 may be disposed at a call processing platform to provide various commerce functions. For example, inmates or other residents of facilities 150-180 may utilize telephone terminals 141 to place commissary orders, such as for candy bars, cigarettes, bed sheets, toiletries, etc. By bringing all this data back to a central site, embodiments of the present invention enable a commissary company to readily deploy commissary functionality with respect to a number of facilities which might not otherwise be economically feasible to do so. Moreover, commissary data with respect the various facilities may be aggregated for electronic delivery to the commissary company, without the commissary company having to deal with placing commissary systems at every facility to collect this data. Of course, as with the justice application management functionality discussed above, where such functionality is provided locally with respect to a facility, such as by commerce systems 146, the data links of the present invention facilitate operation therewith.

It should be appreciated that the use of resources in addition to the aforementioned call application management system, call recording system, justice application management system, and commerce system may be optimized by embodiments of the present invention. For example, customer service agents (not shown) may be provided with respect to inmate management and call processing system 101 to provide such as call assistance and the like, even where call volume associated with any one of facilities 150-180 is insufficient to economically support such personnel.

Similarly, the use of communication lines may be optimized using a centralized configuration of the present invention. For example, where discrete call processing systems are deployed with respect to facilities, it may be necessary to purchase telephone lines on the order of one to every two or three telephone terminals provided at the facility. However, centralized configurations of the present invention are expected to allow improved telephone trunking such that telephone lines on the order of one to every four or five telephone terminals served at the facilities by the call processing platform will be sufficient. Such efficiencies in telephone trunking may be achieved because each of the facilities is unlikely to be experiencing similar calling demand simultaneously. For example, the call processing system may provide services to facilities in different time zones, allowing one facility to utilize telephone lines at a time another facility is not using the telephone lines. Additionally, some facilities may be experiencing periods of exceptionally low telephone utilization, such as during lock-down, allowing the system to readily accommodate other facilities experiencing periods of exceptionally high telephone utilization, such as associated with a facility providing unusually numerous break periods to inmates. The variations in calling across all of the facilities allows centralized call processing systems of the present invention to optimize utilization of bandwidth.

It should be appreciated that the aforementioned trunking of resources at the call processing platform substantially mitigates capacity limitations with respect to each particular facility. For example, rather than being limited at any one instant to processing a number of calls equal to the individual telephone lines (or telephone line equivalents) purchased with respect to a particular facility, embodiments of the present invention will allow processing of a number of calls equal to the number of telephone terminals at a particular facility. Such instantaneous peak capacities may be accommodated in part by embodiments of the present invention taking advantage of the fact that digital communication (e.g., VoIP) allows aggregating calls into less bandwidth as well as taking advantage of the optimized utilization of bandwidth as discussed above.

Having described embodiments of the various aspects of an inmate management and call processing system of the present invention above, reference will now be made to FIG. 3 wherein a flow diagram of operation of the platform in providing calling services according to an embodiment is shown. Operation according to the flow diagram illustrated in FIG. 3 begins at step 301 were a calling party places a telephone terminal, such as one of telephone terminals 141, in an off hook condition. At step 302, a call processing gateway, such as one of call processing gateways 140, coupled to the telephone terminal establishes a link between the telephone terminal and a centralized call processing platform of the present invention, such as computer-based platform 101. The link between the telephone terminal and call processing platform may be established by call processing gateway providing loop current to the telephone terminal and beginning a VoIP packet flow directed to an IP address associated with the call processing platform via a packet network, such as network 130.

At step 303 of the illustrated flow diagram, the call processing platform interacts with the calling party and collects call data, such as by utilizing IVR functionality of call application management system 110. The aforementioned interaction with the calling party may comprise soliciting calling party identification information and/or presenting menu options, such as may allow selection of placing an outbound call, ordering commissary items, and checking an account balance. These menu selections may present further queries based upon the menu selection made. For example, when the calling party selects placing an outbound call, the call application management system may solicit a number to be called and a desired payment method (e.g., prepaid account, postpaid account, collect call, etc.).

Assuming outbound calling services are desired, the illustrated flow diagram proceeds to step 304 wherein the call application management system interacts with the validation system to determine call treatment. For example, validation system 113 may analyze calling party identification information to verify that the party has outbound calling privileges at the present time. Additionally or alternatively, validation system 113 may analyze the number to be called to verify that calls are allowed to be placed to that number. Validation system 113 may further analyze the desired payment method, perhaps interacting with call treatment system 115 and/or billing system 112, to determine if sufficient funds are available to allow the call and/or to determine if an acceptable risk with respect to collecting monies is associated with the desired payment method.

A determination is made at step 305 with respect to whether the call is authorized based upon information provided by the validation system. If the call is determined not to be authorized at step 305, processing according to the illustrated embodiment proceeds to step 306 wherein the call application management system does not connect the call, perhaps playing a message to the calling party stating the reason(s) the call will not be completed. However, if the call is determined to be authorized at step 305, processing according to the illustrated embodiment proceeds to step 307 wherein the call application management system connects the call.

It should be appreciated that processing of the call according to embodiments of the invention to this point in the illustrated flow diagram has been in the digital domain, with the exception of the link between the telephone terminal and the call processing gateway. Preferred embodiments of the present invention provide connection of the call to a carrier network, such as SIP/MGCP network 191, in digital format. However, embodiments of the present invention may provide connection of the call to a carrier network, such as PSTN 192, in analog format, such as by call application management system 110 cooperating with media gateway 117 to connect the call.

There is no limitation according to the present invention that connection to a carrier network being provided at the centralized location of the call processing platform. For example, a caller in a particular facility may place a call to a called party which is local to the facility, whereas the centralized location is not. In such a situation, call application management system 110 of an embodiment of the present invention may implement the call connection by "hairpinning" the call content data (e.g., VoIP data packets) back through network 130 to the call processing gateway 140 of the particular facility and controlling call processing gateway 140 to connect the data stream to an interface coupled to a local carrier line, where such a line has been provided. Even where such local carrier connections are supported, embodiments of the present invention continue to provide call content data streams from the call processing gateway to the call processing platform, such as for recording of the call by call recording system 116, accounting for the call by billing system 112, and/or real-time monitoring of the call by call application management system 110, unauthorized call activity detection system 114, and/or word search functionality of call recording system 116.

It should be appreciated that the aforementioned redirection of the call content data stream for local carrier connection at a facility is not limited to redirection at the facility at which the calling party is located. For example, it may be determined that, although a called party is not local to the call processing platform, the called party is local to a facility of the call processing system other than that associated with the calling party. Accordingly, where that facility supports local carrier connections, a call application management system of the present invention may redirect the call content data flow for local connection by that facility.

Although it may appear at first impression that connection of call content data streams to carrier networks at a centralized location such as that associated with call processing platform 101 may unnecessarily incur long distance and other toll charges, research has revealed that contrary to such conventional thoughts significant savings may be had through an embodiment employing centralized carrier connection. In a typical scenario, one may expect to pay approximately $0.05 per minute for intralata calling and from approximately $0.02 to $0.03 per minute for interstate calling where significant call volume is present. Also typically, one may expect to pay no per minute charges for interlata calling, although a monthly line charge will be incurred for having line availability. In contrast, however, research has revealed that intralata and interstate calling may be provided for per minute charges on the order of $0.01 when calls are delivered to the carrier network in digital format (e.g., SIP), which presents a significant savings over the above interlata call charges and appreciable savings over the above interstate call charges. Accordingly, even where calls local to a facility and would not otherwise experience a per minute charge, embodiments of the present invention are expected to provide economic savings by backhauling the call to a centralized location for connection to a carrier network. These economic advantages are further expected to be enhanced through the optimization of bandwidth, as discussed above, allowing a reduced number of total lines to be purchased, thereby lowering the monthly line charges to the service provider.

Figure 3:
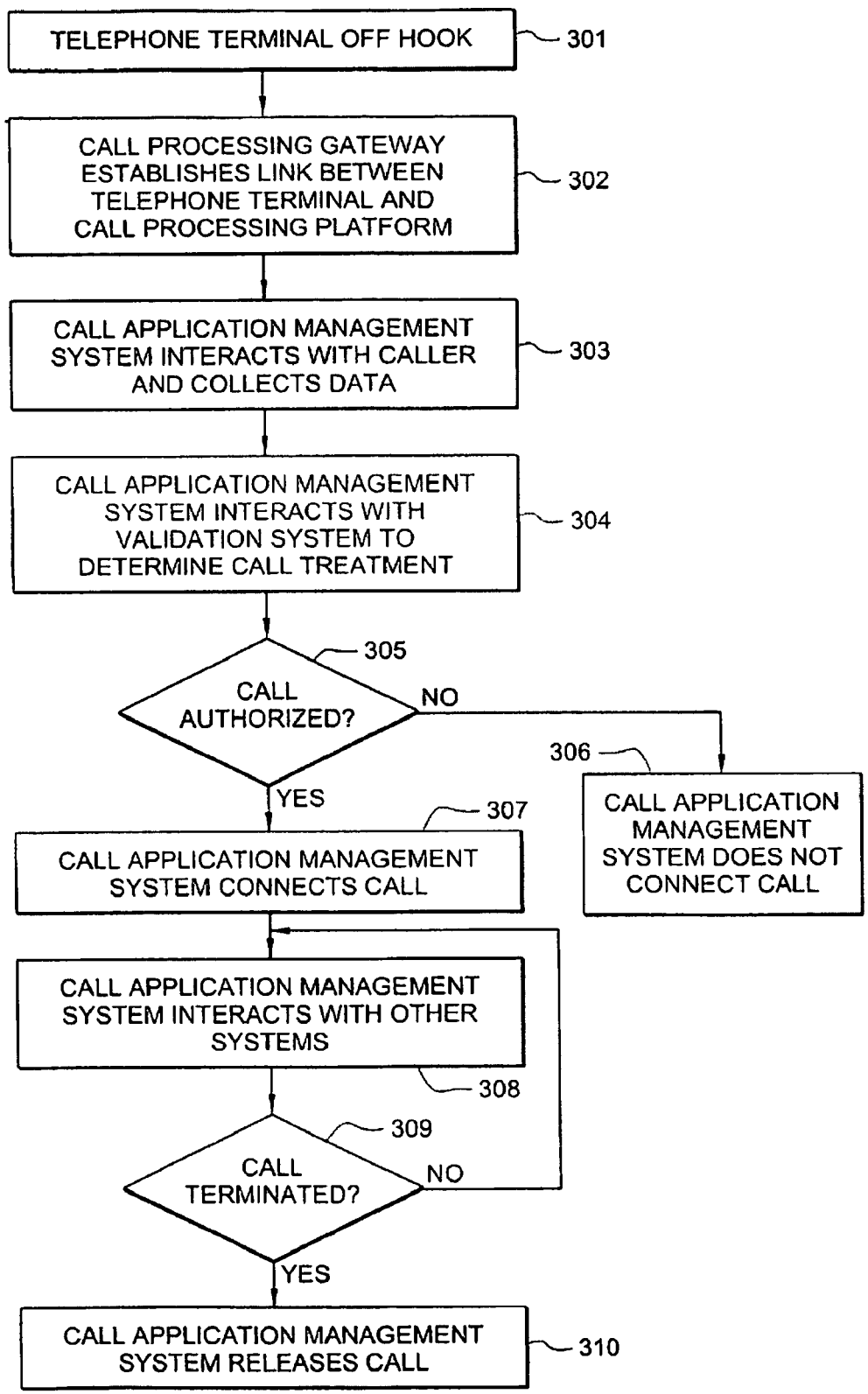
FIG. 3 shows a flow diagram of a call processing operation of the inmate management and call processing system of FIG. 1 according an embodiment of the present invention.

Continuing with the flow diagram illustrated in FIG. 3, after connecting a call at step 307, the call application management system interacts with other systems of the call processing platform in providing a continued connection at step 308. For example, call application management system 110 may signal call recording system 116 to record the call content. Additionally or alternatively, call application management system 110 may cooperate with unauthorized call activity detection system 114 to ensure that a calling or called party does not implement an unauthorized calling feature, such as three-way calling, during the call.

At step 309 a determination is made as to whether the call is terminated. For example, call application management system 110 may determine that an attempt has been made to implement an unauthorized calling feature and therefore may terminate the call. Similarly, call application management system 110 may determine that a call time limit or account balance has expired and therefore may terminate the call. Alternatively, either of the calling or called parties may terminate the call. If it is determined that the call has not been terminated at step 309, the illustrated embodiment returns to step 308 for the call application management system to continue interaction with other systems of the call processing platform in providing a continued connection. However, if it is determined that the call has been terminated at step 309, processing according to the illustrated embodiment proceeds to step 310 wherein the call application management system releases the call.

Although embodiments herein have been described with reference to telephone terminals, it should be appreciated that the present invention is not limited to use with respect to any particular type of user device. For example, video phones, multi-media computers, cellular phones, personal digital assistants (PDAs), and the like may be coupled to an inmate management and call processing system of the present invention for providing the aforementioned services, if desired.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

We claim:

1. A computer-based system, at a plurality of facilities, for managing inmate information, each of the facilities having one or more telephone terminals and computer terminals, the computer-based system located remotely from at least one of the plurality of facilities, the system comprising:
   a networking device exchanging Voice over Internet Protocol (VoIP) data packets with call processing gateways at the plurality of facilities over communication links, the call processing gateways processing the VoIP data packets to or from the telephone terminals for transmission over the communication links;
   an inmate management system coupled to the networking device for providing shared data access of inmate records to computer terminals at said plurality of facilities, said inmate records created with first inmate information collected from a first computer terminal at a first facility of the plurality of facilities and second inmate information from a second computer terminal at a second facility of the plurality of facilities; and
   a call application management system connecting a call to or from the telephone terminals over a telephone carrier network responsive to receiving a request for connecting the call and the call being authorized based on the inmate records provided by the inmate management system.

2. The system of claim 1, wherein said inmate records comprise at least one of physical description of inmates, social security numbers of the inmates, driver's license numbers of the inmates, biometric data of the inmates, information related to the arrest of the inmates, and contact information of third parties associated with the inmates.

3. The system of claim 1, wherein said inmate records comprise a call record associated with inmates.

4. The system of claim 1, wherein said records comprise a call recording associated with inmates.

5. The system of claim 1, wherein said plurality of facilities comprise a mobile police station.

6. The system of claim 1, wherein the plurality of facilities comprise different types of facilities.

7. The system of claim 1, wherein the inmate management system is further configured to control access to the inmate records based on logon information received from the computer terminals.

8. The system of claim 7, wherein the inmate management system further stores inmate accounts for charging fees to the third parties associated with the inmates for connecting calls placed by the inmates from the plurality of telephone terminals.

9. The system of claim 8, wherein the inmate accounts are charged for expenses incurred by said inmates for an activity other than placing the calls.

10. A method for managing inmate information at multiple facilities including a first facility and a second facility, each facility comprising multiple telephone terminals and computer terminals, the method carried out in a computer-based system located remotely from at least one of the multiple facilities, the method comprising:
    receiving, from a first computer terminal at the first facility, first inmate information associated with an inmate;
    receiving, from a second computer terminal at the second facility, second inmate information associated with the inmate;
    generating an inmate record based on the first inmate information and the second inmate information;
    storing the inmate record in the computer-based system for shared access across to the inmate record computer terminals in the multiple facilities;
    receiving a request from one of the multiple telephone terminals for connection of a call over a telephone carrier network; and
    connecting the call from one of the telephone terminals over a telephone carrier network and a communication link responsive to authorizing the call based on the inmate records stored in the computer-based system.

11. The method of claim 10, wherein said first inmate information is-received upon said inmate's arrest.

12. The method of claim 10, wherein said first facility comprises a mobile police station.

13. The method of claim 10, further comprising:
    modifying said inmate record responsive to transferring the inmate from one facility of the multiple facilities to another facility of the multiple facilities.

14. The method of claim 10, wherein said inmate record comprises at least one of physical description of the inmate, social security number of the inmate, driver's license number of the inmate, biometric data of the inmate, information related to arrest of the inmate, and contact information of third party associated with the inmate.

15. The method of claim 14, further comprising:
    notifying said third party of said inmate's arrest based on the contact information.

16. The method of claim 14, further comprising:
    establishing an inmate account for charging fees to the third party for connecting calls placed by the inmate associated with the inmate account.

17. The method of claim 14, further comprising: charging said inmate account for an expense incurred by said inmate for an activity other than placing the calls.

18. The method of claim 14, further comprising:
    notifying said third party of transfer of the inmate from one facility of the multiple facilities to another facility of the multiple facilities; and establishing another inmate account associated with said third party responsive to transferring the inmate to the other facility.

19. The method of claim 10, wherein the multiple facilities comprise different types of facilities.

20. The method of claim 10, further comprising:
controlling access to the inmate records based on logon information received from the second computer terminals.

* * * * *